United States Patent [19]

Hirohashi et al.

[11] Patent Number: 5,532,858
[45] Date of Patent: Jul. 2, 1996

[54] OPTICAL RADIO TRANSMISSION SYSTEM AND A METHOD FOR ADJUSTING OPTICAL AXES THEREOF

[75] Inventors: Kazutoshi Hirohashi, Yokohama; Teruhiko Shinomiya; Manabu Sakane, both of Yokosuka; Keishi Ushijima, Fukuoka; Takaaki Takeda, Tokyo; Masamichi Satou, Tokyo; Michio Kikuta, Tokyo; Motoyasu Nagashima, Kashiwa, all of Japan

[73] Assignees: Nit Data Communications Victor Company of Japan, Yokohama; Systems Corporation, Tokyo, both of Japan

[21] Appl. No.: 136,848

[22] Filed: Oct. 18, 1993

[30] Foreign Application Priority Data

Oct. 16, 1992 [JP] Japan ................................ 4-304638

[51] Int. Cl.⁶ .......................... H04B 10/10; H04B 10/24
[52] U.S. Cl. .................... 359/159; 359/152; 359/172
[58] Field of Search ................................ 359/152, 159, 359/172

[56] References Cited

U.S. PATENT DOCUMENTS

| | | | |
|---|---|---|---|
| 2,494,645 | 1/1950 | Collins | 359/159 |
| 4,684,248 | 8/1987 | Cinzori | 359/159 |
| 5,142,400 | 8/1992 | Solinsky | 359/159 |

FOREIGN PATENT DOCUMENTS

| | | | |
|---|---|---|---|
| 0042388 | 4/1977 | Japan | 359/159 |
| 0183926 | 7/1989 | Japan | 359/159 |
| 0001633 | 1/1990 | Japan | 359/159 |
| 237997 | 8/1990 | Japan . | |
| 2122044 | 1/1984 | United Kingdom | 359/159 |

OTHER PUBLICATIONS

Dye, "New Infrared Reciprocal Tracking Laser Communicator", Conference Electro Optics/Laser International 80 UK, Brigton England, 25–27 Mar. 1980 pp. 297–307.

*Primary Examiner*—Leslie Pascal
*Attorney, Agent, or Firm*—Lowe, Price, LeBlanc & Becker

[57] ABSTRACT

An optical radio communication system comprising a first light transmitting system and a second light transmitting system. Each of said first and second light transmitting system comprising a transmitting means and a receiving means. Said transmitting means comprising a light emitting element positioned in a region including and surrounding a focal point of a first parabolic reflector for emitting light beams, said first parabolic reflector having an inner reflective surface for reflecting said light beams emitted from said light emitting element, and a means for driving said light emitting element with a signal to be transmitted. Said receiving means comprising a second parabolic reflector having an inner reflective surface for reflecting incident light beams, a light receiving element positioned in a region including and surrounding a focal point of said second parabolic reflector for receiving light beams reflected by said second parabolic reflector to output signals, and means for taking out information from said signals outputted from said light receiving element. In this optical radio communication system, broadband signals such as Manchester coded signals are directly transmitted on optical radio.

16 Claims, 39 Drawing Sheets

2ND STEP

1ST STEP

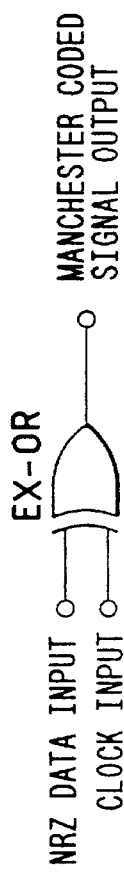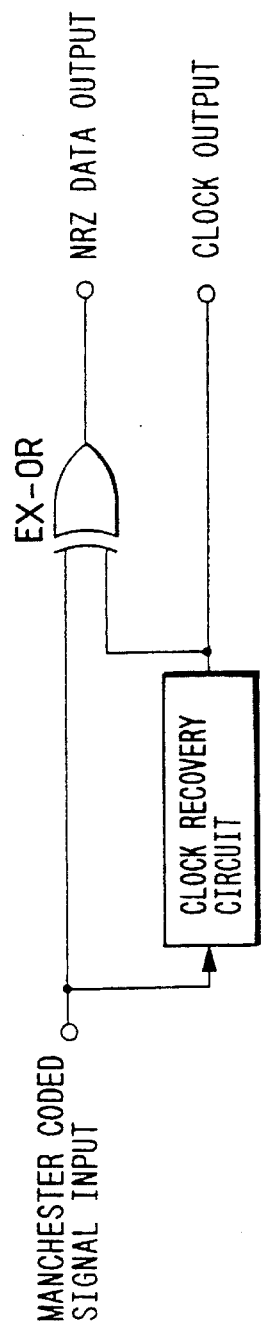
FIG. 15A
FROM NRZ TO MANCHESTER
FIG. 15B
FROM MANCHESTER TO NRZ

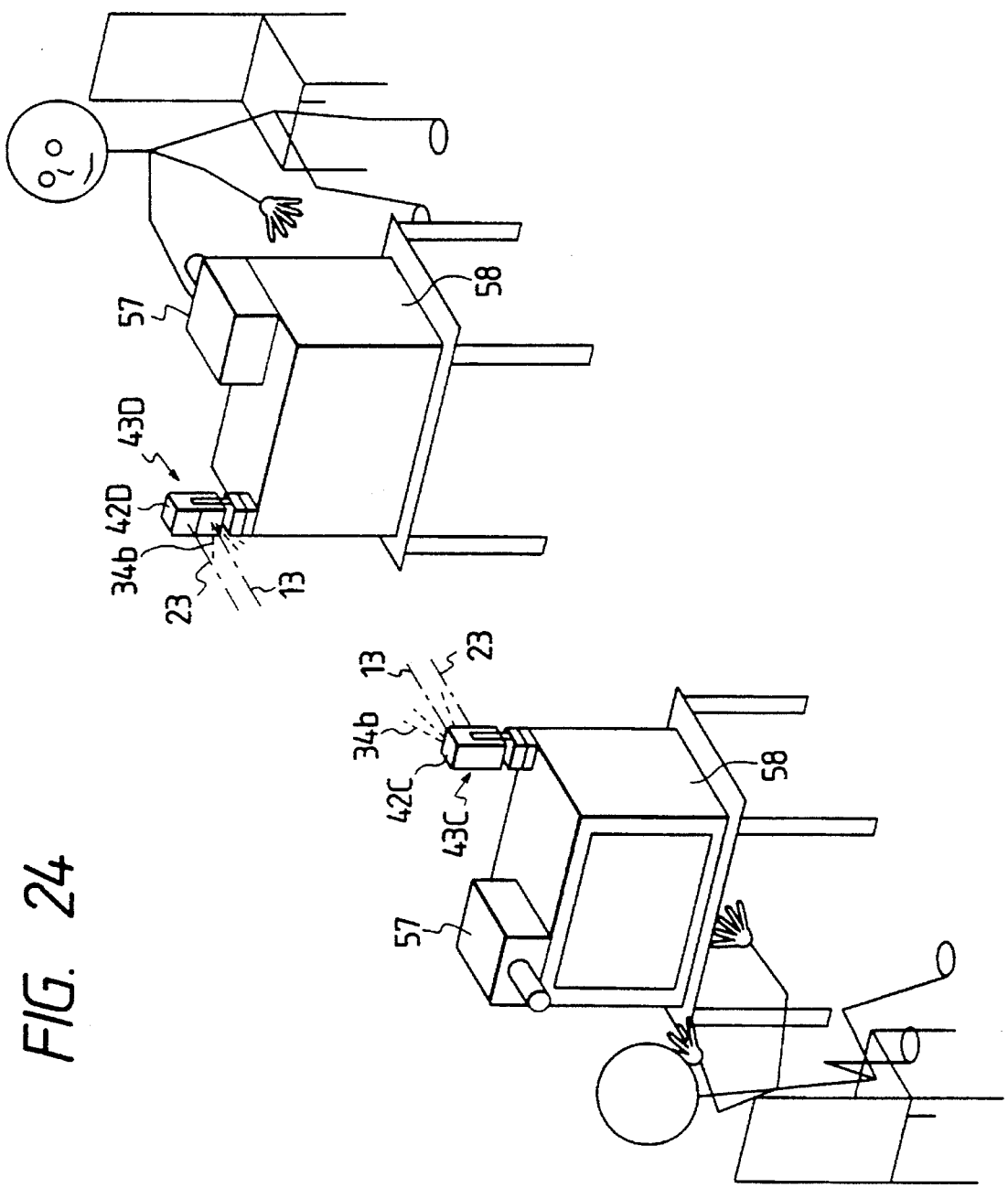

1ST SYSTEM

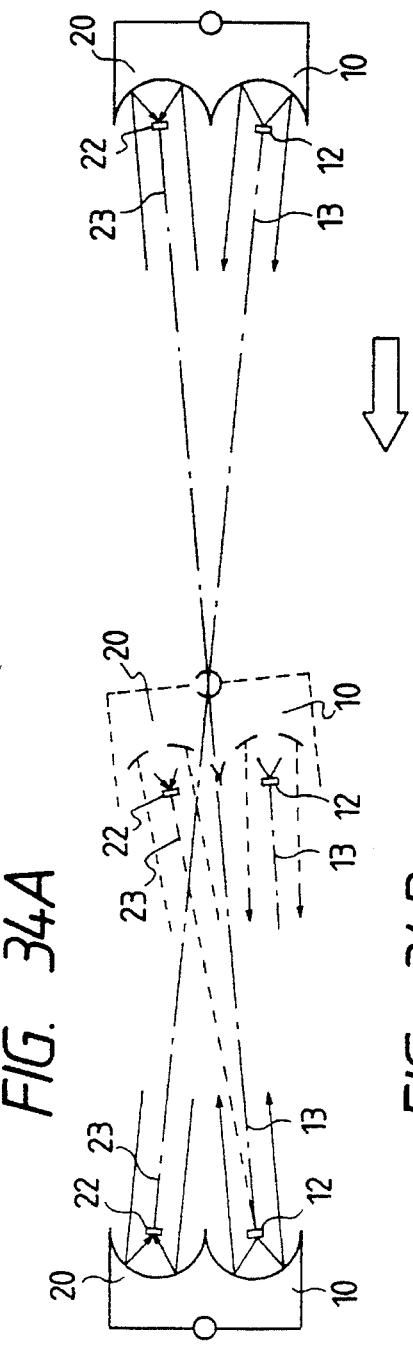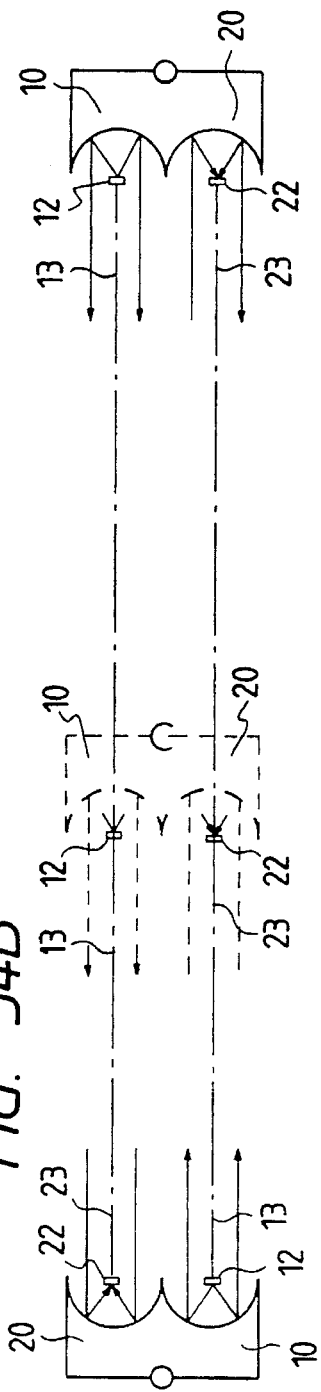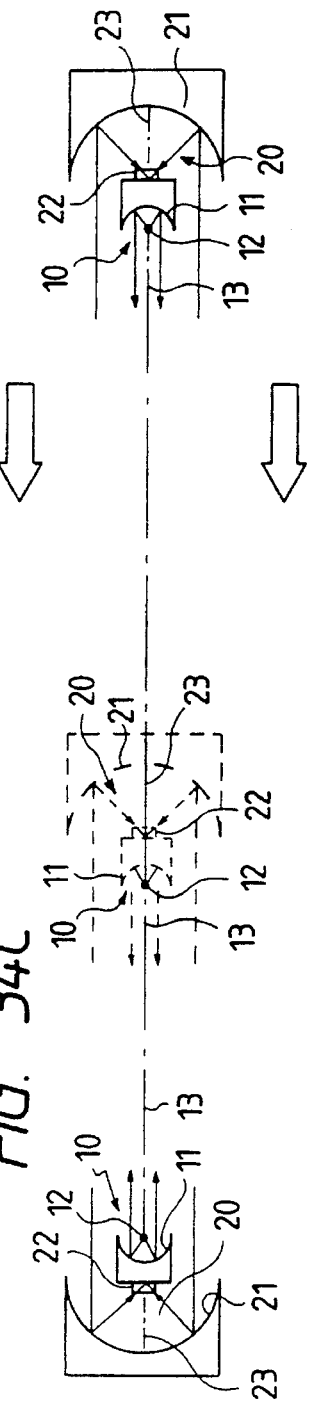

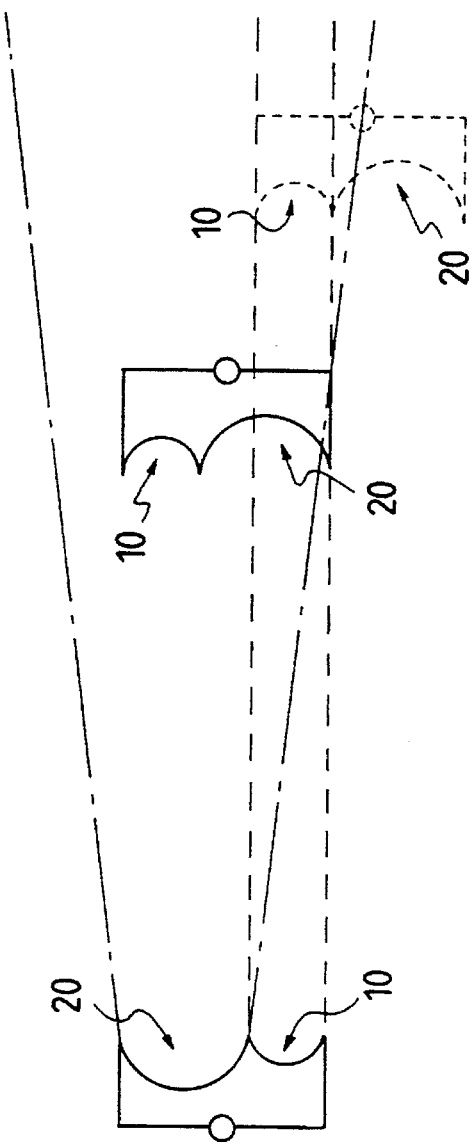
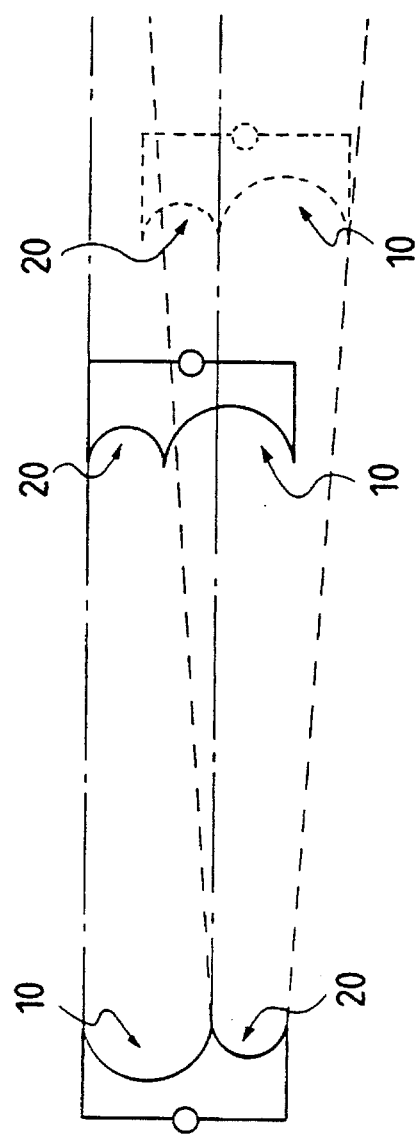
FIG. 35A
FIG. 35B

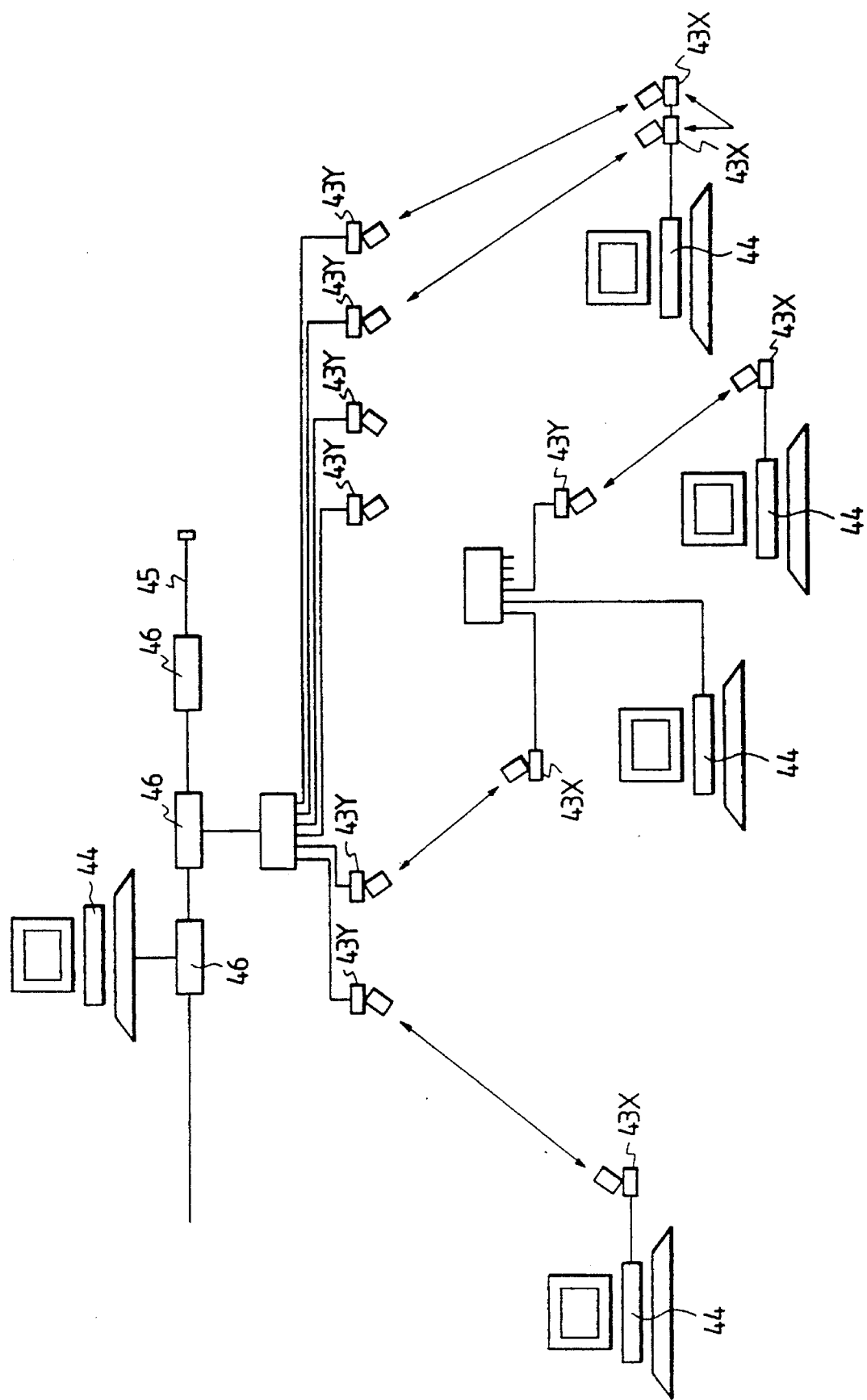

OPTICAL RADIO TRANSMISSION SYSTEM AND A METHOD FOR ADJUSTING OPTICAL AXES THEREOF

BACKGROUND OF THE INVENTION

The present invention relates to an optical radio transmission, more specifically, to an optical radio transmitting system including a transmitter and a receiver, where the transmitter transmits a signal over optical radio to a receiver, and a method for adjusting an optical axis of the transmitter of such optical radio transmitting system to an optical axis of the receiver of the same to establish a communication path therebetween.

A light emitting diode (LED) or a laser diode is typically used as a light emitting element in optical radio signal transmission. The laser diode is generally used to transmit signals between buildings or across a river, since it generates narrow light beams which does not spread even if travelling a long distance. However, as the light beams emitted from a laser diode are liable to cause a damage to a human body, especially eyes, it is thus undesirable to use it in a system in places such as residential buildings, office buildings, factories, etc., wherever man is present.

A LED generates light beams as shown in FIG. 12, which is of a wide directivity. Therefore, the LED is unsuitable to long-distance transmission since the light beam emitted thereby tends to spread out as the distance increases. However, a combination of such LED with a convergent lens permits increase of a transmission distance. In which case, data are frequency-modulated or phase-modulated to be broadband signals for transmission since light noise developed by lighting or illumination has mainly a spectrum in a low frequency.

The LED thus has a disadvantage that, in an optical radio transmission system in which the LED transmits signals, a diameter of the light beams increases and a power of the light beams decreases when the light beams travels for a long-distance, although employment of a convergence lens contributes to narrowing-down of the diameter to a certain degree. The spread of light beams easily causes interference when plural sets of transmission systems are used closely in parallel, or deterioration of quantity of signals when received by receivers.

In addition, the transmitting system employing LED necessitates modulation and demodulation circuits to carry out frequency-modulation or phase-modulation on signals to transmit them as broadband signals. This demands a larger scale circuit. FIGS. 13(a) through 13(c) show Manchester coded signals, FIG. 13(a) representing 0 in the Manchester coding and FIG. 13(b) representing 1. It is known that a Manchester coded signal has a spectrum distributed in a low frequency. When signals are transmitted in a from of Manchester code, every bit always has a transition at its mid-point, as shown in FIG. 13(c).

Referring to FIG. 14, a Manchester coded signal has a spectrum of which the frequency width is two times that of a Non-Return-to-Zero (NRZ) signal. The Manchester coded signals contain no direct current (DC) component but a little low frequency components. Moreover, the fact that the Manchester coded signal itself contains a clock component permits easy and complete synchronization. To process such Manchester coded signals, only simple coding and decoding circuits are required. Illustratively, FIG. 15(a) shows a circuit diagram of a coder which is formed with an exclusive OR gate to which Non-Return-to-Zero (NRZ) data and a clock signal are applied to output a Manchester coded signal. FIG. 15(b) shows a circuit diagram of a decoder which is also formed with a clock recovery circuit and exclusive OR gate to which a clock recovered by the clock recovery circuit and a received Manchester coded signal are applied to output NRZ data.

Direct transmission of Manchester coded signals on radio waves is currently legally prohibited because its transmission band is dominated by a transfer rate of the data. There is no legal restriction on transmission on light waves, but technical problems lies in that it is impossible to completely prevent entrance of interfering light since a receiver cannot be formed with a sufficiently narrow directivity. In addition, it is difficult to employ Manchester coded signals, which contain low frequency components to a certain degree, because of concentration of noise spectrum of interfering light in a lower frequency region.

In the case of optical radio wide-band transmission or optical radio transmission through a plurality of transmission paths in the same frequency band within the same area, a narrow directivity of emitted light beams and a narrow directivity of a transmitter and a receiver are dispensable for efficient transmission. It becomes more difficult to accurately adjust an optical axis of a transmitter to an optical axis of a receiver upon settlement of a communication path as the required directivities becomes narrower. Additionally, a little deviation of the optical axis due to vibration or the like easily yields an error in the communication. In Japanese Patent Publication No. HEI 2-37997, there is disclosed a transmission system using light beams having a narrow directivity where a receiver is provided with a corner reflector which reflects incident light beams emitted from a transmitter to feed it back to the same transmitter, then the maximum level of the light beams reflected by the corner reflector is detected to adjust an optical axis of the transmitter. This system is effective, but necessitates rather complex structure, thus costly. Additionally, it is difficult to always carry out fine adjustment of the optical axis automatically in this system.

SUMMARY OF THE INVENTION

It is an object of the present invention to provide an optical radio transmission system which enables a long-distance optical radio communication without occurring interference of light beams if a plural sets of optical radio transmission system are simultaneously used in parallel, also enables transmission of Manchester coded signals directly over optical radio wave.

It is another object of the present invention to provide a method for adjusting an optical axis of a receiver to an optical axis of a transmitter in the above optical radio transmitting system.

The present invention therefore provide an optical radio communication system comprising at least a first light transmitting system and a second light transmitting system, each of said light transmitting system comprising a transmitting means comprising a light emitting element positioned in a region including and surrounding a focal point of a first parabolic reflector for emitting light beams, said first parabolic reflector having an inner reflective surface for reflecting said light beams emitted from said light emitting element, and a means for driving said light emitting element with a signal to be transmitted, a receiving means comprising a second parabolic reflector having an inner surface for reflecting incident light beams, a light receiving element positioned in a region including and surrounding a focal point of said second parabolic reflector for receiving light beams reflected by said second parabolic reflector to output signals, and means for taking out information from said signals outputted from said light receiving element. In this optical radio communication system, data is transmitted as broadband signals such as Manchester coded signals that substantially contain no direct current components.

According to this invention, said first parabolic reflector reflects light beams emitted by said light emitting element so that said light beams may travel in parallel, thereby preventing the light beams from spreading out even in a long-distance travel and from interfering with each other if a plurality of light transmitting systems are operatively installed in parallel. In such system, it is possible to directly transmit signals such as Manchester coded signals over optical radio.

In an aspect of this invention, said optical radio communication system may comprise a plurality of more light transmitting systems and a plurality of light receiving systems.

In another aspect of this invention, said transmitting means and a receiving means are integrally combined with each other to form either of said first and second light transmitting systems. It is possible to form both of said first and second light transmitting system with integrally combined transmitter-receiver system to accomplish duplex optical radio communication.

In still another aspect of this invention, it is possible to provide a light projector means having a wide directivity to said transmitter of either one or both of said first and second light transmitting means, which effectively emits guide beams useful to adjust optical axes of said light transmitting systems.

In still another aspect of this invention, it is possible to provide a light receiver means having a wide directivity to said receiving means of either one or both of said first and second light transmitting means, which effectively receives guide beams useful to adjust optical axes of said light transmitting systems.

This invention also provide a method for adjusting optical axes of said light transmitting systems of the above optical radio communication system comprising the steps of emitting guide beams from said transmitting means of said second light transmitting system, receiving said guide beams at said receiving means of said first light transmitting system by shifting an optical axis of said receiving means thereof, and adjusting light transmitting means on the basis of a level of said guide beams received by said receiving means.

In the above method, it is possible to emit guide beams from said projector means having a wide directivity to carry out rough adjustment of the optical axes of said system. It is also possible to receive guide beams at said light receiving means having a wide directivity, that is useful to carry out rough adjustment of optical axes of said systems.

BRIEF DESCRIPTION OF THE DRAWING

A more complete appreciation of this invention and many of the attendant advantages thereof will be readily obtained as the invention becomes better understood by reference to the following detailed description when considered in connection with the accompanying drawings, wherein:

FIGS. 15($a$) and 15($b$) are circuit diagram of a coder and decoder for the Manchester coded signal shown in FIGS. 13($a$) through 13($c$);

FIG. 1.7 is a block diagram showing an example of an Ether network, where the optical radio transmitting system shown in FIGS. 16($a$) through 16($c$) are employed;

FIG. 24 is a block diagram of an example of an optical radio visual telephone network, where the optical radio transmitting systems shown in FIGS. 22(a) and 22(b) are employed;

FIG. 25(a) and 25(c) are vertical sectional views of a pair of optical radio transmitting systems, and FIG. 25(c) is a front view of either one of the optical radio transmitting systems shown in FIG. 25(a);

FIGS. 26(a) and 25(b) are circuit diagrams of a pair of optical radio transmitting systems according to still another embodiment of this invention, where a wide angle receiving means and a wide angle transmitting system are employed;

FIG. 30(a) shows a relationship between the element and a parabolic reflector and FIG. 30(b) is an illustration showing an relationship between the narrow angle light receiving element shown in FIG. 30(a) and a light spot;

FIGS. 34(a), 34(b) and 34(c) are block diagrams each showing a positional relationship between a pair of optical radio transmitting systems in the case of combined transmitter-receiver;

FIGS. 35(a) and 35(b) are block diagrams each showing directivity of parabolic reflectors between a pair of combined transmitter-receiver; and FIG. 36 is a block diagram of an example of a network employing optical radio transmitting systems therein according to this invention.

DETAILED DESCRIPTION OF THE PREFERRED EMBODIMENT

Figure 1:
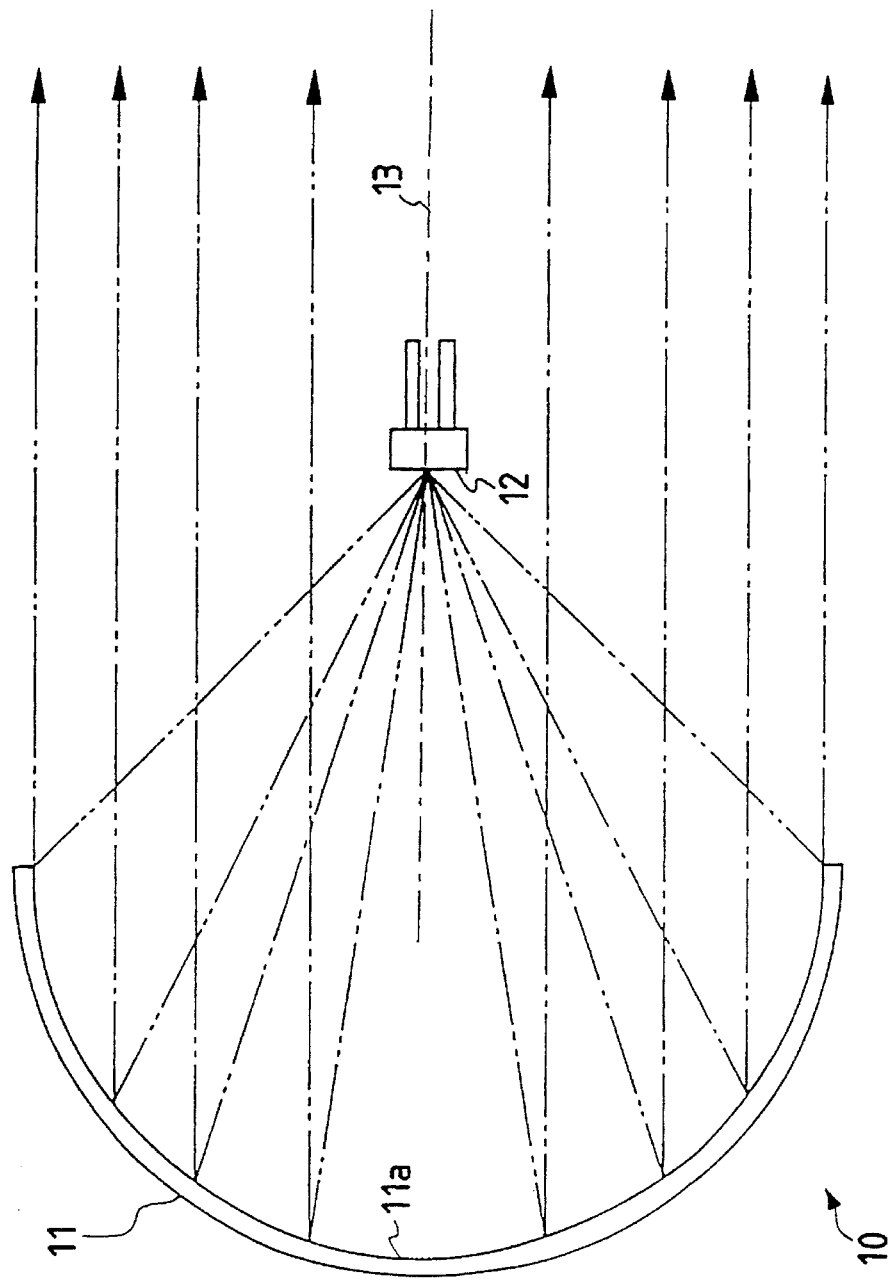
FIG. 1 is a vertical sectional view of a transmitter according to this invention.

Now, referring to the drawings, like reference characters designate like or corresponding parts throughout the views.

Figure 2:
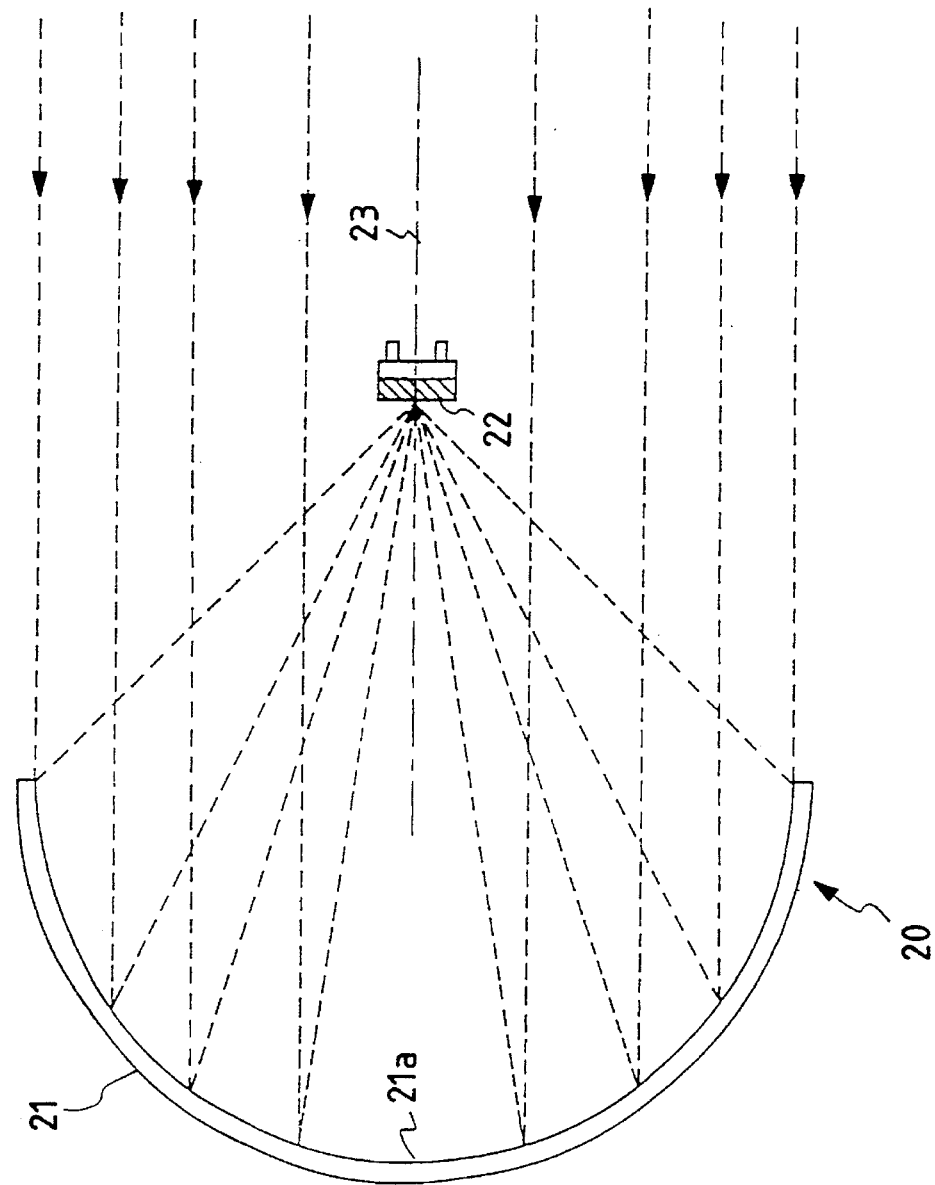
FIG. 2 is a vertical sectional view of a receiver according to this invention.
Figure 3:
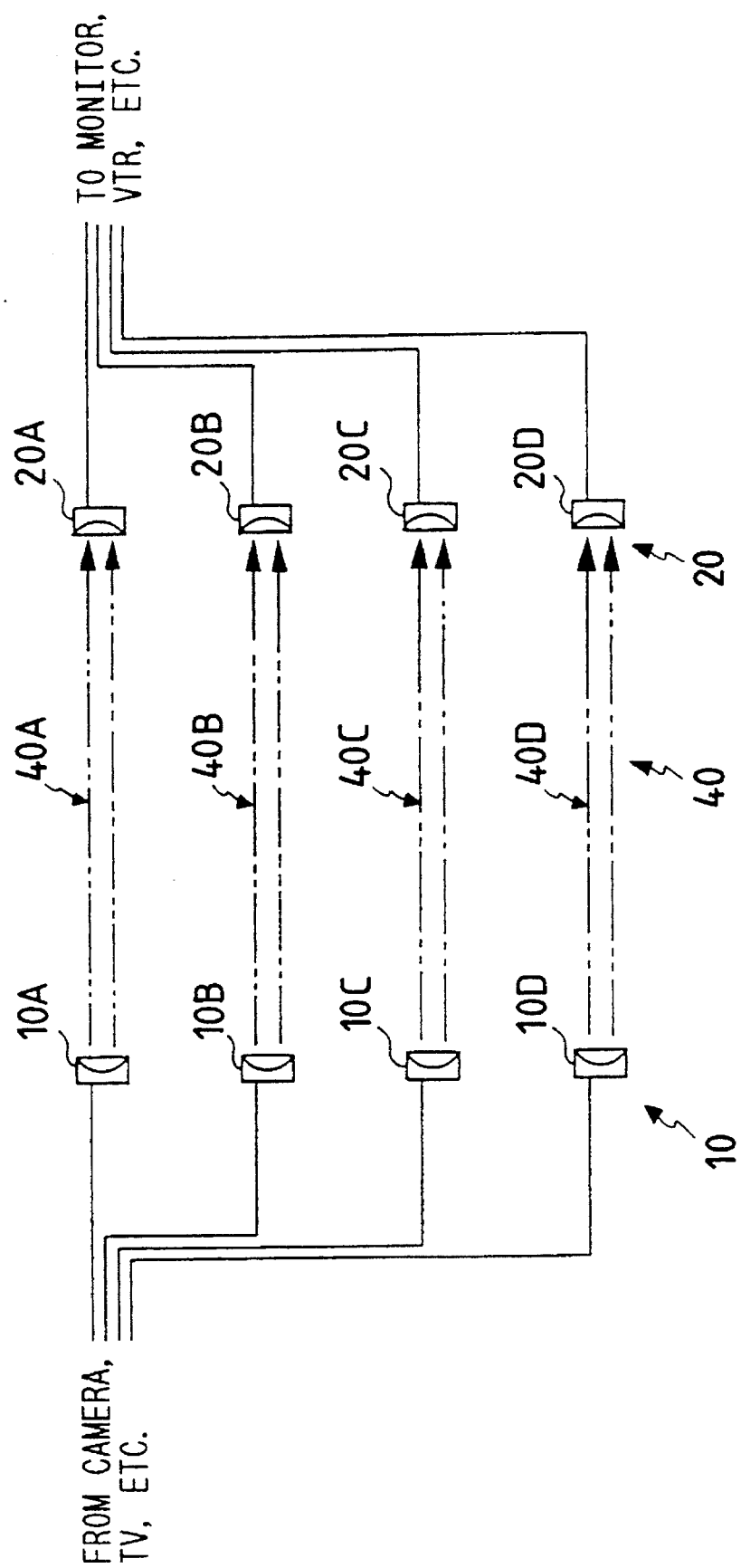
FIG. 3 is a block diagram of an example where a plurality of optical radio transmitting systems comprising the transmitter of FIG. 1 and the receiver of FIG. 2 are operated in parallel.
Figure 4:
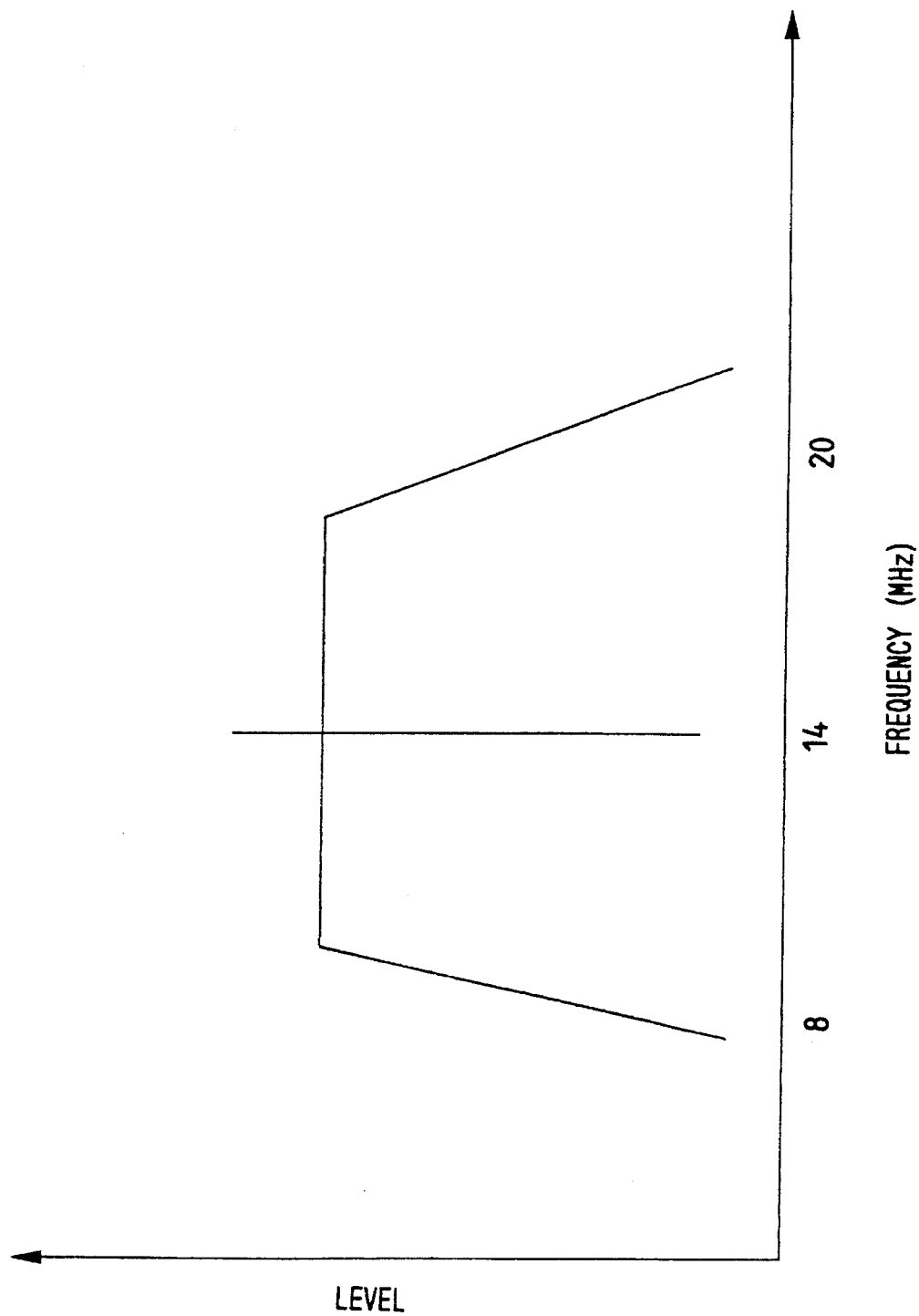
FIG. 4 is a graph showing a frequency spectrum of a signal transmitted in the systems shown in FIGS. 1 through 3.

FIG. 1 is a vertical sectional view of an optical radio transmitting means 10, FIG. 2 is also a vertical sectional view of an optical radio transmission receiving means 20, FIG. 3 is a schematic diagram of an optical radio transmission network employing plural sets of transmitting and receiving means shown in FIGS. 1 and 2 operably installed parallel to each other, and FIG. 4 is a graphical representation of a frequency spectrum of a signal used in the network.

In FIG. 1, the optical radio transmission transmitting means 10 comprises a parabolic reflector 11 and a light emitting element 12 which is positioned at a focal point of the parabolic reflector 11 or within a region closely surrounding the focal point so that light beams emitted from the light emitting element 12 are reflected by an inner reflective surface 11a of the parabolic reflector 11 to travel in parallel. It is preferable that a focal distance of the parabolic reflector 11, a diameter of an opening of the parabolic reflector 11 and an angle formed with a leading edge of the parabolic reflector 11 should be so determined that the light beams emitted by the light emitting element 12 may be completely reflected by the parabolic reflector 11.

It is desirable that the light emitting element 12 should be a light emitting diode (LED) which is capable of emitting a large amount of light and has a wide angle of radiation. The parabolic reflector 11 may have an opening of, for example, 10 cm. The parabolic reflector 11 of the optical transmitting means 10 may be made by curing it out from an aluminum block, the inner reflective surface 11a is then polished, or made of a synthetic resin, the inner reflective surface 11a is then plated with a metal in order to providing a metallic surface thereto. This may be applied to a parabolic reflector 21 of an optical receiving means 20, details of which will be described later.

With the above arrangement, the transmission by means of the light beams of a diameter equal to that of the parabolic reflector 11 of the transmitting means 11 may prevent increase of the diameter of the light beams and decrease of the power of the light beams in the minimum degree when the light beams are received by the receiving means 21, thus effectively preventing interference between transmitters installed in parallel to each other, for example, transmitters 10A through 10D shown in FIG. 3, to accomplish a long distance transmission.

Referring to FIG. 2, there is depicted an optical radio transmission receiving means 20 comprising a parabolic reflector 21 and a light receiving element 22 positioned at a focal point of the parabolic reflector 21 or within a region closely surrounding the focal point so that incident light beams reflected by the parabolic reflector 11a of the transmitting means 11 are caused to be converged onto the focal point or a point in the vicinity of the focal point, then received by the light receiving element 22. The receiving means 21 is thus of a narrow directivity, allowing large reduction of the effects of disturbing light and is able to correctly receive signals such as Manchester coded signals directly transmitted from the transmitting means 10 through optical radio transmission.

Referring to FIG. 3, there is depicted an example that a plurality of optical radio transmission means 40, i.e., four transmission means shown in the drawing. Every transmission means 40A–40D includes a transmitting means 10A–10D and a receiving means 20A–20D with the structure above-mentioned. Each transmitting means 10A–10D transmits video signals for one channel, the four transmitting means 10A–10D are thus used to transmit video signals for four channels in all. The video signals to be transmitted are broadband signals which are frequency-modulated and have a spectrum shown in FIG. 4. The spectrum shown in FIG. 4 has a center frequency of 14 MHz, distributed within ±6 MHz, not including low frequency components.

In each of the optical radio transmission means 40A–40D, the transmitting means 10A–10D transmits light beams the diameter of which is narrowed down by the parabolic reflector 11 so that the corresponding receiving means 20A–20D may receive the light beams without suffering from interference even in a long-distance transmission when plural sets of transmission means 40A–40D are operatingly installed in parallel to each other. The broadband signal having a spectrum shown in FIG. 4 transmitted from the transmitting means 10 is received by the receiving means 20, and is then passed through a high-pass filter to extract information. If the receiving means 20 can receive a sufficient quantity of light, the parabolic reflector 21 used to focus the light beams may be omit ted.

Figure 5:
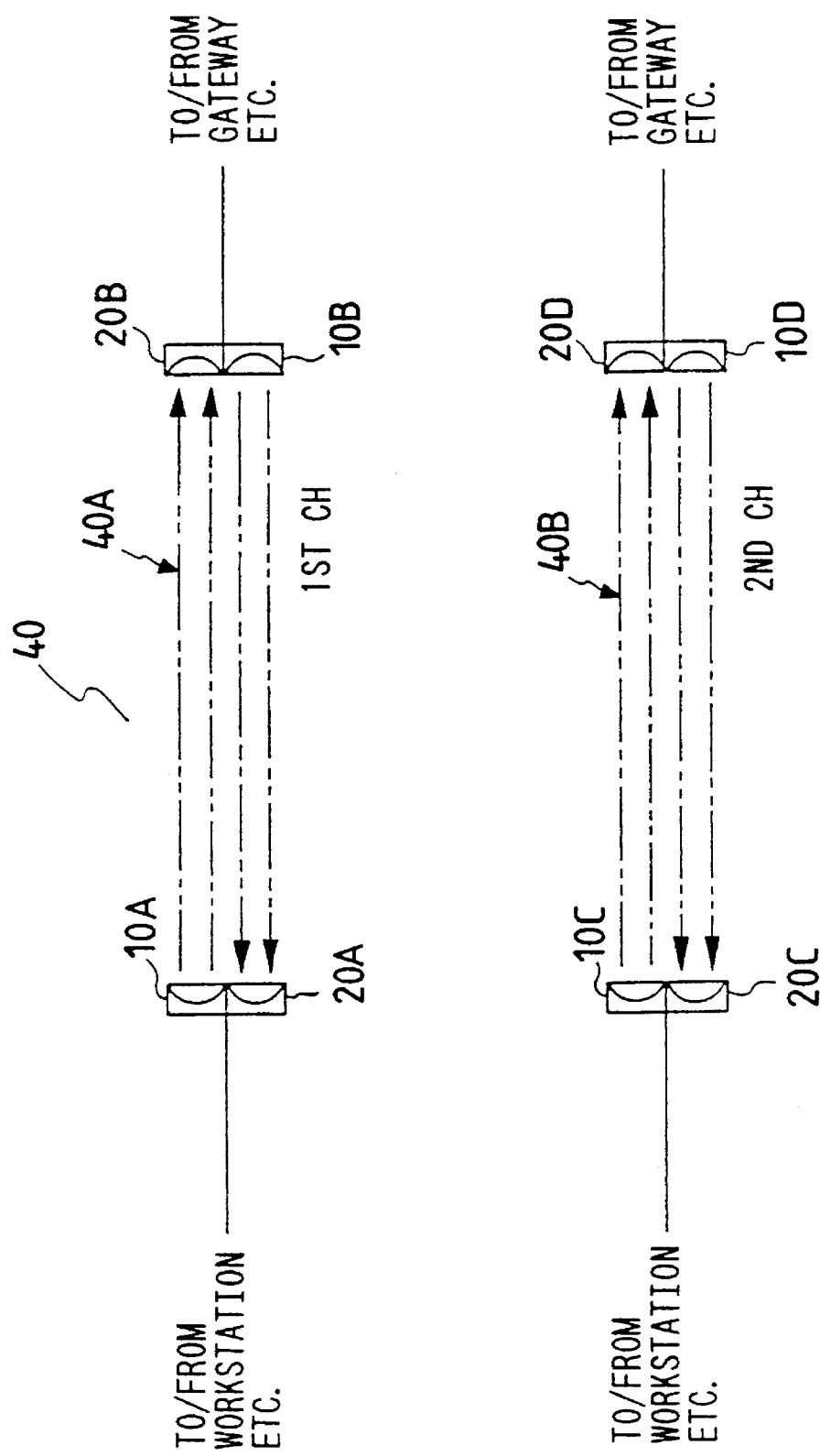
FIG. 5 is a block diagram of another example where plural sets of optical radio transmitting systems are used in parallel for duplex transmission.

FIG. 5 shows another example of an optical radio transmission system 40 used to transmit data at 10 Mbps as Manchester coded signals for two channels in duplex transmission. The optical radio transmission system 40 is made up of two optical radio transmission means 40A and 40B, each of which includes a set of combined transmitting-receiving means, 10A and 20A, 10B and 20B, 10C and 20C, and 10D and 20D. In this case, if the signals are transmitted through two channels or through the same channel in two-ways simultaneously, the Manchester coded signals are correctly received by the receivers 20A–20D without suffering from interference since each parabolic reflectors 11 of the transmitting means 10A–10D narrows down the diameter of the light beams and a parabolic reflector 21 of the corresponding receiving means 20A–20D converges only the light flux that is parallel to an optical axis of the parabolic reflector 21.

Figure 6:
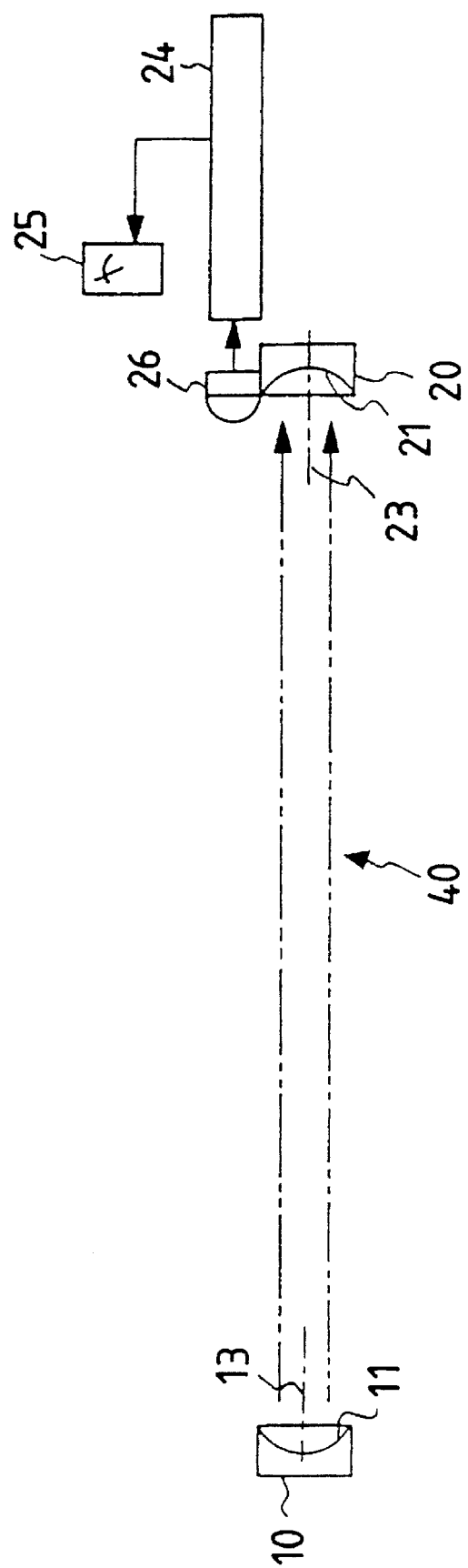
FIG. 6 a block diagram illustrating a method for adjusting an optical axis of a receiver to that of a transmitter of the optical radio transmitting system shown in FIG. 3.

Referring to FIG. 6, there is illustrated a method for adjusting an optical axis of an optical radio transmission means 40 comprising a transmitting means 10 and a receiving means 20. The receiving means 20 is provided with a light receiver 26, a light level detector 24 and a level meter 25. The light receiver 26 is of a relatively wide-directivity to effectively detect a level of incident light beams. When the optical axis of the parabolic reflector 11 of the transmitting means 10 does not coincide with that of the parabolic reflector 21 of the receiving means 20, there are used the light receiver 26 for receiving the light beams from the transmitting means 10, the light level detector for detecting the level of the incoming light beams and the level meter 25 for displaying the detected level of the incoming light beams.

This method requires two persons. One positions on the side of the transmitting means 10, the other positions on the side of the receiving means 20. The one on the side of the receiving means 20 watches the indication of the level meter 25 and the other on the side of the transmitting means 10 adjusts an optical axis 13 of the transmitting means 10. After completion of the adjustment, the one on the side of the receiving means 20 operates the light level detector 24 to switch from the light receiver 26 to the light receiving element 22 and so adjust an optical axis 23 of the transmitting means 20 that the level meter 25 indicates the maximum value. To carry out this method, the adjustment of the receiving means 20 requires at least one person.

Figure 7:
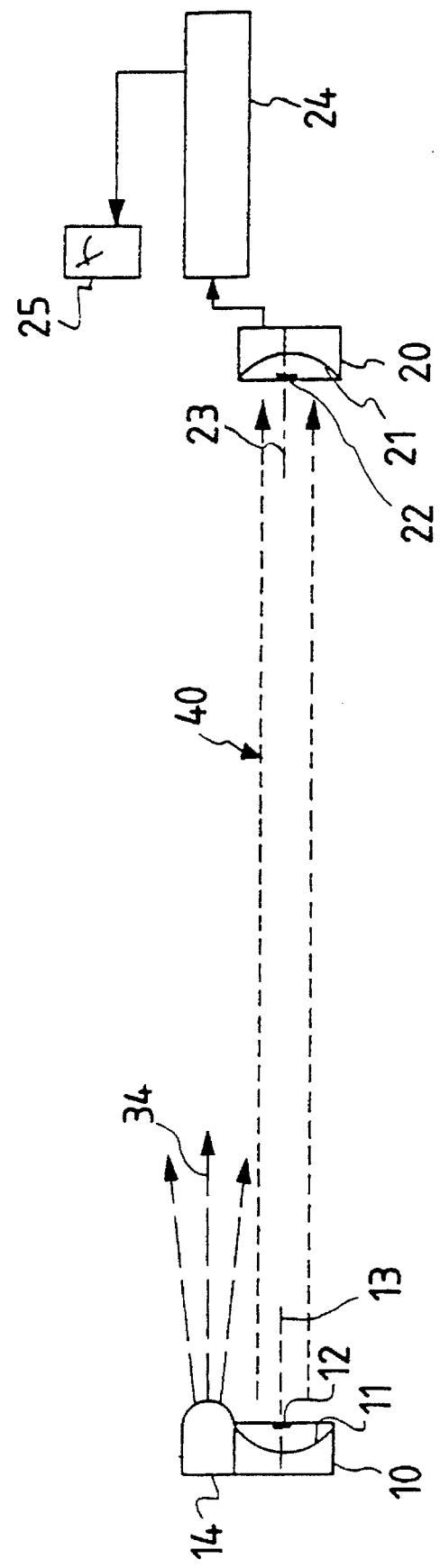
FIG. 7 is a block diagram illustrating another method for adjusting an optical axis of a receiver to that of a transmitter of the optical radio transmitting system shown in FIG. 3.

FIG. 7 illustrates another method for adjusting optical axes 13 and 23 of an optical radio transmission means 40 comprising a transmitting means 10 and a receiving mean; 20. The transmitting means 10 is provided with a projector 14 used to adjust the optical axes 13, 23, which has a relatively wide directivity. The receiving means 20 is provided with a light intensity level detector 24 and a level meter 25. The light intensity level meter 24 and the level detector 25 are serially connected to the receiving means 20. First, a rough adjustment is carried out by radiating guide beams from the projector 14 of the transmitting means 10 into a wide range and so adjusting the optical axis 23 of the receiving means that the level meter 25 of the receiving means 20 indicates the maximum value. Next, a fine adjustment is carried out by turning off the projector 14 of the transmitting means 10, radiating light beams from the light emitting element 12 and so adjusting the optical axis 23 of the receiving means 20 that the level meter 25 indicates the maximum value. This method requires at least one person who moves between the transmitting means and the receiving means to alternately adjust them.

Figure 8:
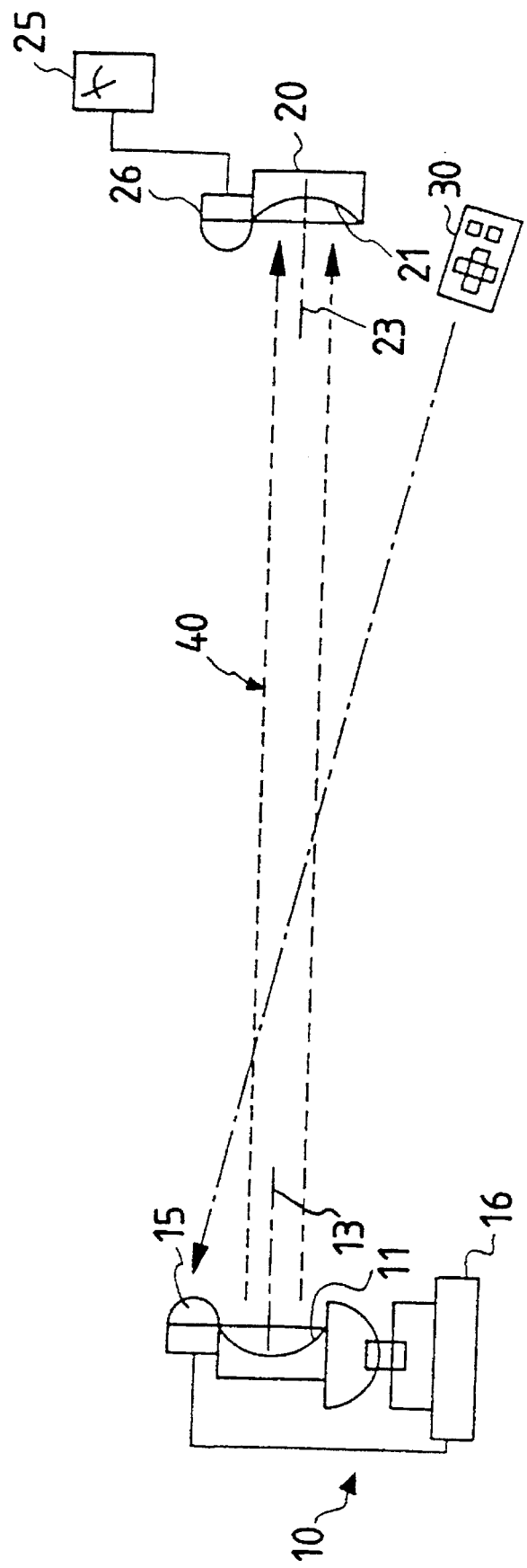
FIG. 8 is a block diagram illustrating still another method for adjusting an optical axis of a receiver to that of a transmitter of the optical radio transmitting system shown in FIG. 3.

FIG. 8 illustrates still another method for adjusting optical axes 13 and 23 of an optical radio transmission means 40. The optical radio transmission 40 comprises a transmitting means 10 and a light receiving means 20. The transmitting means 10 is provided with a receiver 15 which receives a control signal from a remote controller 30 placed on the side of the receiving means 20 and a rotating mechanism 16 used to change the direction of the transmitting means 10. The receiving means 20 is provided with another light receiver 26 which receives light beams radiated from the transmitting means 10 and a level meter 25 which indicates an intensity level of the light beams coming into the light receiver 26 and is connected in series with the light receiver 26. The level meter 25 is connected is series with the light receiver 26. This method requires at least one person positioning on the side of the receiving means 20. He or she can manually so adjust the direction of the receiving means 20 that the level meter 25 indicates the maximum value and operates the remote controller 30 to output the control signal to the receiver 15 of the transmitting means 10. The rotating mechanism 16 changes the direction of the transmitting means 10 in response to the control signal. The above steps are carried out alternately until the optical axes 13 and 23 of the transmitting means 10 and the receiving means 20 coincides with each other. This method may be combined with the method shown in FIG. 6 or 7, thereby providing an easier adjustment.

Figure 9:
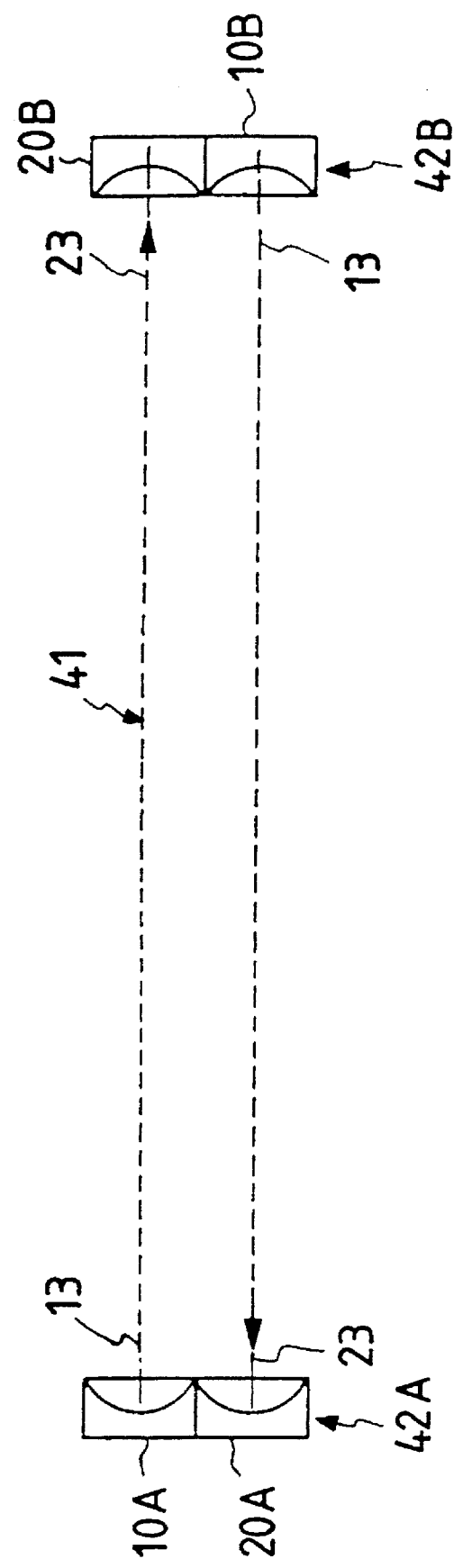
FIG. 9 is a block diagram of another optical radio transmitting system according to this invention, where a transmitter and a receiver are integrally formed.

FIG. 9 shows an example of an optical radio transmission system applicable to the present invention. The system is used for dual optical radio transmission circuit 41. The transmitting means 10A and 20A are so assembled in one-piece that optical axes 13 and 23 thereof are parallel to each other, serving as an optical radio transmitting system 42A. In the same manner, the transmitting means 10B and 20B are also so assembled in one-piece that optical axes 13 and 23 thereof are in a parallel relationship, serving as another optical radio transmitting system 42B. That is, optical axes 13 and 23 of parabolic reflectors 11 and 21 of the transmitting and receiving means 10A and 20A or 10B and 20B are adjusted to be parallel to each other upon assembly. According to this example, adjustment of only the optical axis 13 of the transmitting means 10A or 10B allows adjustment of the remaining optical axis 23 of the receiving means 20A or 20B. It is possible to carry out the adjustment by one person by combining this with the method set forth above.

Figure 10:
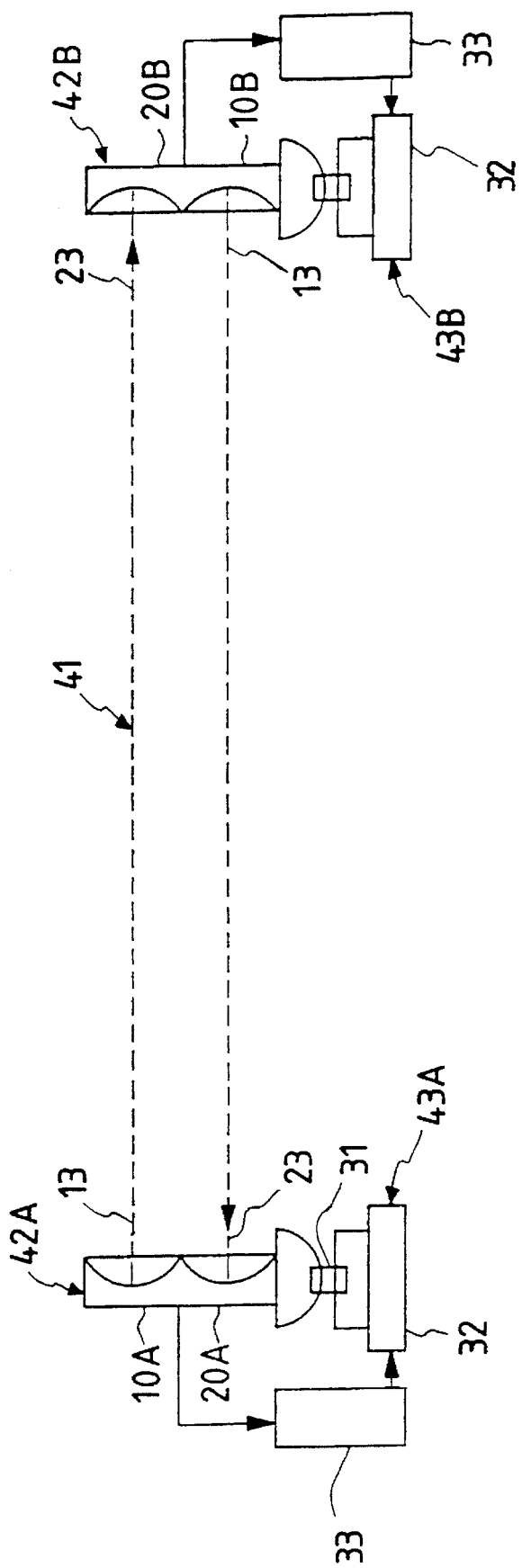
FIG. 10 a block diagram illustrating a method for adjusting optical axes of the optical radio transmitting systems shown in FIG. 9.

FIG. 10 illustrates still another method for adjusting the optical axes 13,23 in the dual optical ratio transmission circuit 41 comprising the optical transmitting-receiving systems 42A,42B shown in FIG. 9. Each of the optical radio transmitting-receiving system 42A or 42B is provided with a vertically rotating mechanism 31 and a horizontally rotating mechanism 32 and a rotating mechanism controller 33. The vertically rotating mechanism 31 rotates the optical axes 13 and 23 of the optical transmitting-receiving system 42A OF 42B in a vertical direction with respect to the horizontal plane at a predetermined pitch, while the horizontally rotating mechanism may rotate the optical axes 13 and 23 in a horizontal direction at a predetermined pitch. Each of the transmitting-receiving system 42A or 42B is additionally provided with a rotating mechanism controller 33 including a light level detecting means (not shown).

Figure 29:
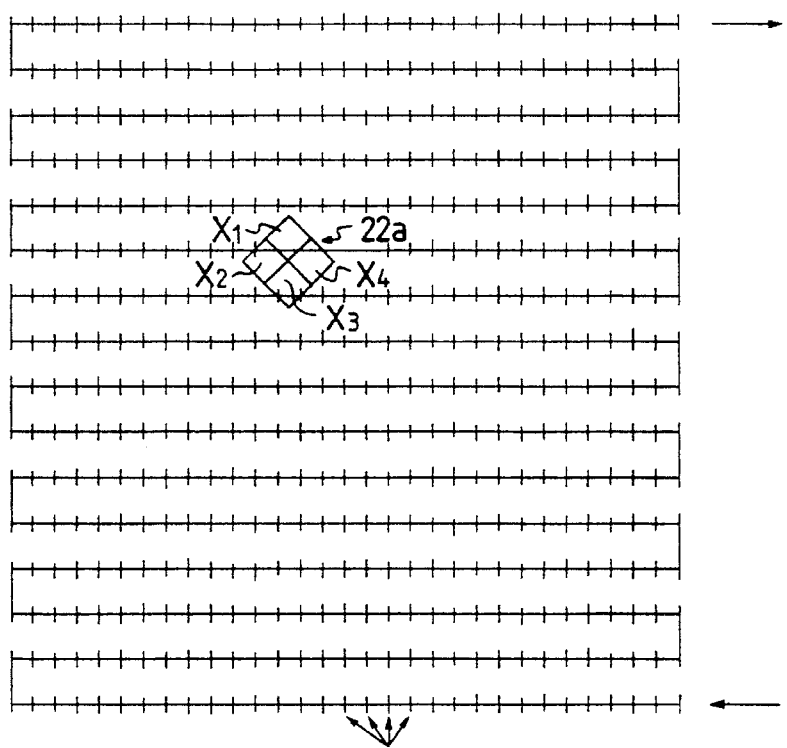
FIG. 29 is an illustration of a map of search points used for a search operation of the optical radio transmitting system shown in FIGS. 27(a) and 27(b)

A method for adjustment of the optical axes 13 and 23 of the system shown in FIG. 9 will be now described referring to FIG. 10. The rotating mechanism controller 33 including a microcomputer not shown controls operations of the vertically rotating mechanism 31 and the horizontally rotating mechanism 33. The vertically rotating mechanism 31 and the horizontally rotating mechanism 32 cause the transmitting-receiving system 42A of 42B to carry out scanning by sweeping in the vertical and horizontal directions under the control of the rotating mechanism controller 33. This scanning is performed from left to right with respect to the vertical section of the optical pass of the light beams, then left to right again after being lowered one line, in the similar manner to one-field-scanning in a television receiver (refer to FIG. 29). While being scanning light signals transmitted from the transmitting means 10B of the optical radio transmitting-receiving system 43B shown on the right side of the drawing, the receiving means 20A shown on the left side of the drawing receives the light signals. The light intensity level detecting means (not shown and analogous to the light intensity level detecting means 24 of FIG. 7) provided in the turning mechanism controller 33 detects an intensity level of the incident light beams to store it with an address of a coordinate value of its scanning point into a memory of the microcomputer in the turning mechanism controller 33. After completion of this scanning, adjustment of the optical axes 13 and 23 of the transmitting-receiving system 42A shown on the left side in the drawing is completed. Thereafter, the same operation is carried out in the transmitting-receiving system 42B shown on the right side in the drawings in order to adjust the optical axes 13 and 23 thereof by operating a rotating mechanism controller 33 and the vertically and horizontally rotating mechanisms 31 and 32. Incidentally, the transmitting-receiving system 42A on the left side is identical with the transmitting-receiving system 42B on the right side, excepting a vertical positional relationship of the transmitting means 10A or 10B with the receiving means 20A or 20B.

As appreciated from the above, once the adjustment of the optical axis.23 of the parabolic reflector 21 of the receiving means 20A in the optical radio transmitting-receiving system 42A has been completed through detection of an intensity level of the incident light beams, it is unnecessary to independently carry out adjustment of the optical axis 13 of the parabolic reflector 11 of the transmitting means 10A, since the transmitting means 10A and the receiving means 20A are integrally combined upon assemblage so that their optical axes 13 and 23 are in parallel. When deviation between the optical axis 13 and optical axis 23 occurs after completion of the adjustment, the microcomputer retrieves the scanning point of the maximum light intensity value with its coordinate value to control the vertically and horizontally rotating mechanisms 31 and 32 so as to adjust the optical axis 23 to the coordinate value of the scanning point, thereby automatically recovering the coincide of the optical axis 13 with the optical axis 23.

In accordance with the above method, it is possible visually determine the approximate directions of transmitting-receiving systems 42A and 42B before conducting the above method to carry out minute adjustment of the optical axes. The above method enables automatic correction of minute deviation of the optical axes developed by external factors such as the effects of gravity, earthquakes, human acts, etc. It is also possible perform the automatic correction every time the system starts up to maintain a preferable transmission condition. It is also possible to provide a projector of the relatively wide-directivity to the transmitting-receiving systems as described later, thereby performing minute automatic correction after rough visual adjustment.

Figure 11B:
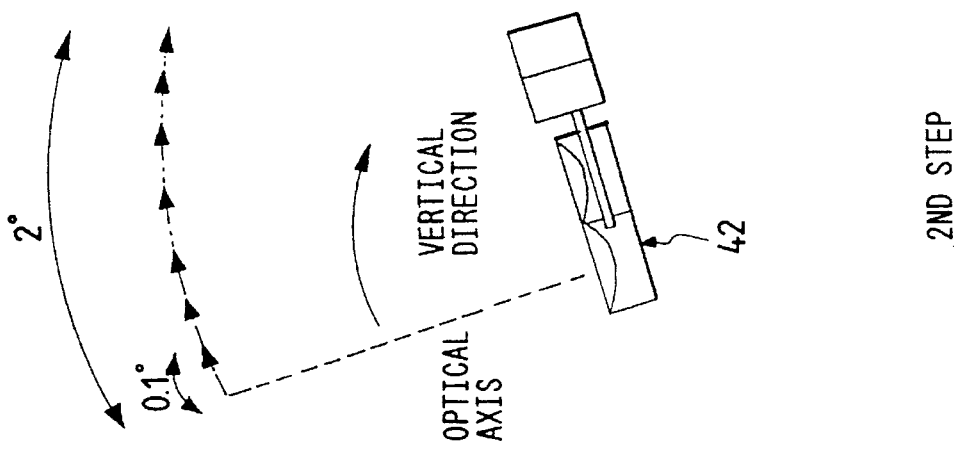
FIGS. 11($a$) and 11($b$) are illustrations showing a scanning process in the method shown in FIG. 10.
Figure 11A:
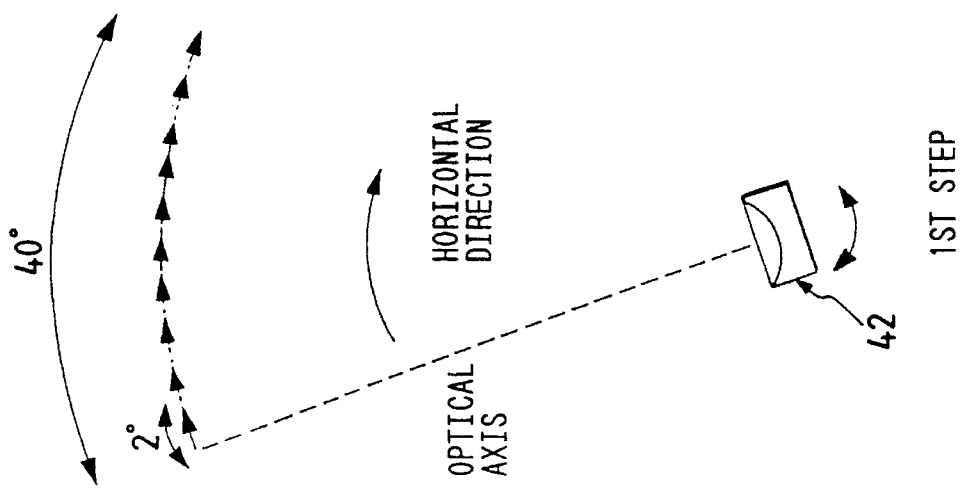
Figure 12:
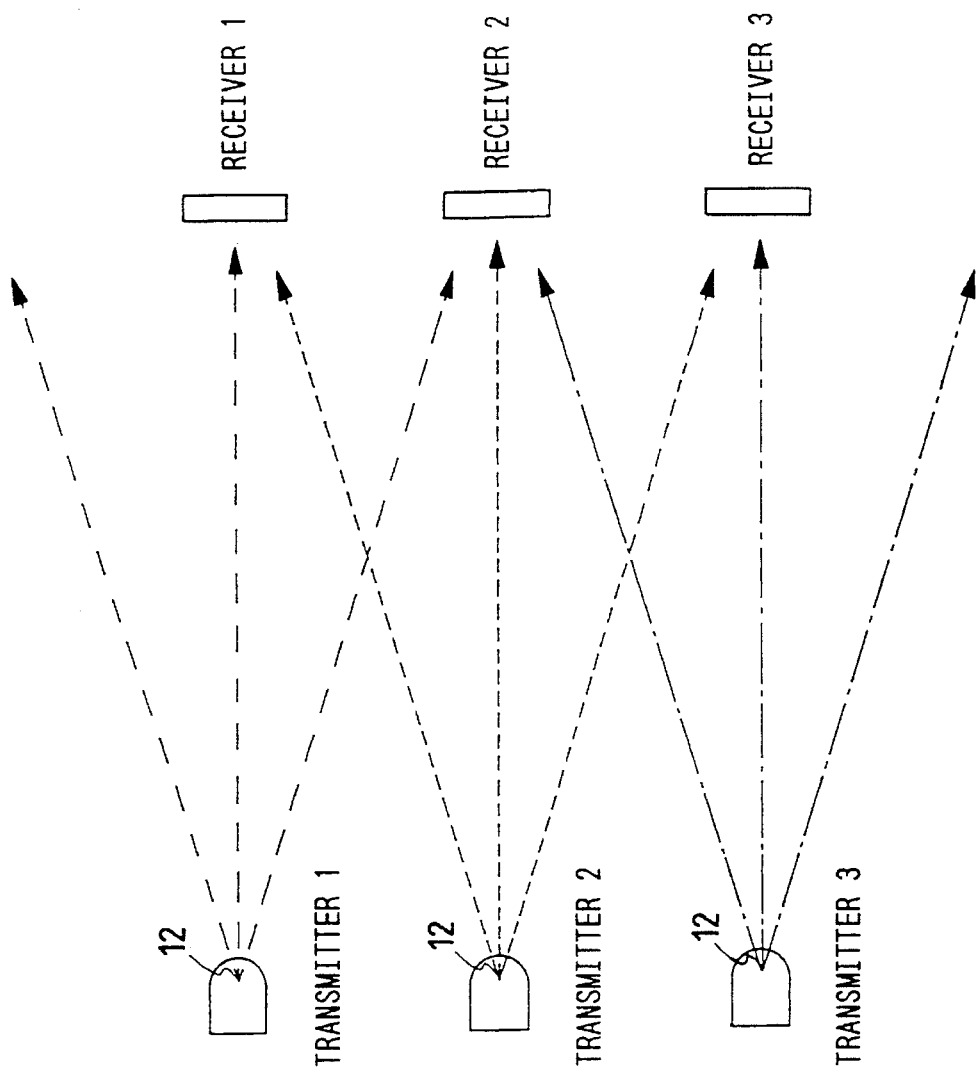
FIG. 12 is a block diagram of conventional optical radio transmission systems installed in parallel to each other.
Figure 13A:
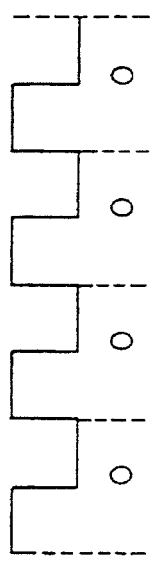
FIGS. 13($a$), 13($b$) and 13($c$) show Manchester coded signals.
Figure 13B:
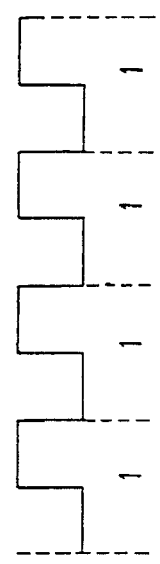
Figure 13C:
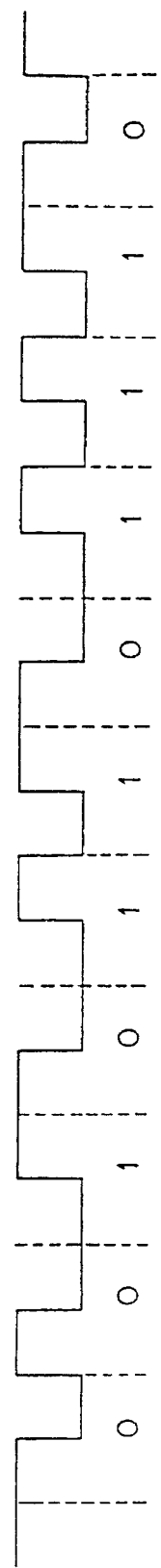
Figure 14:
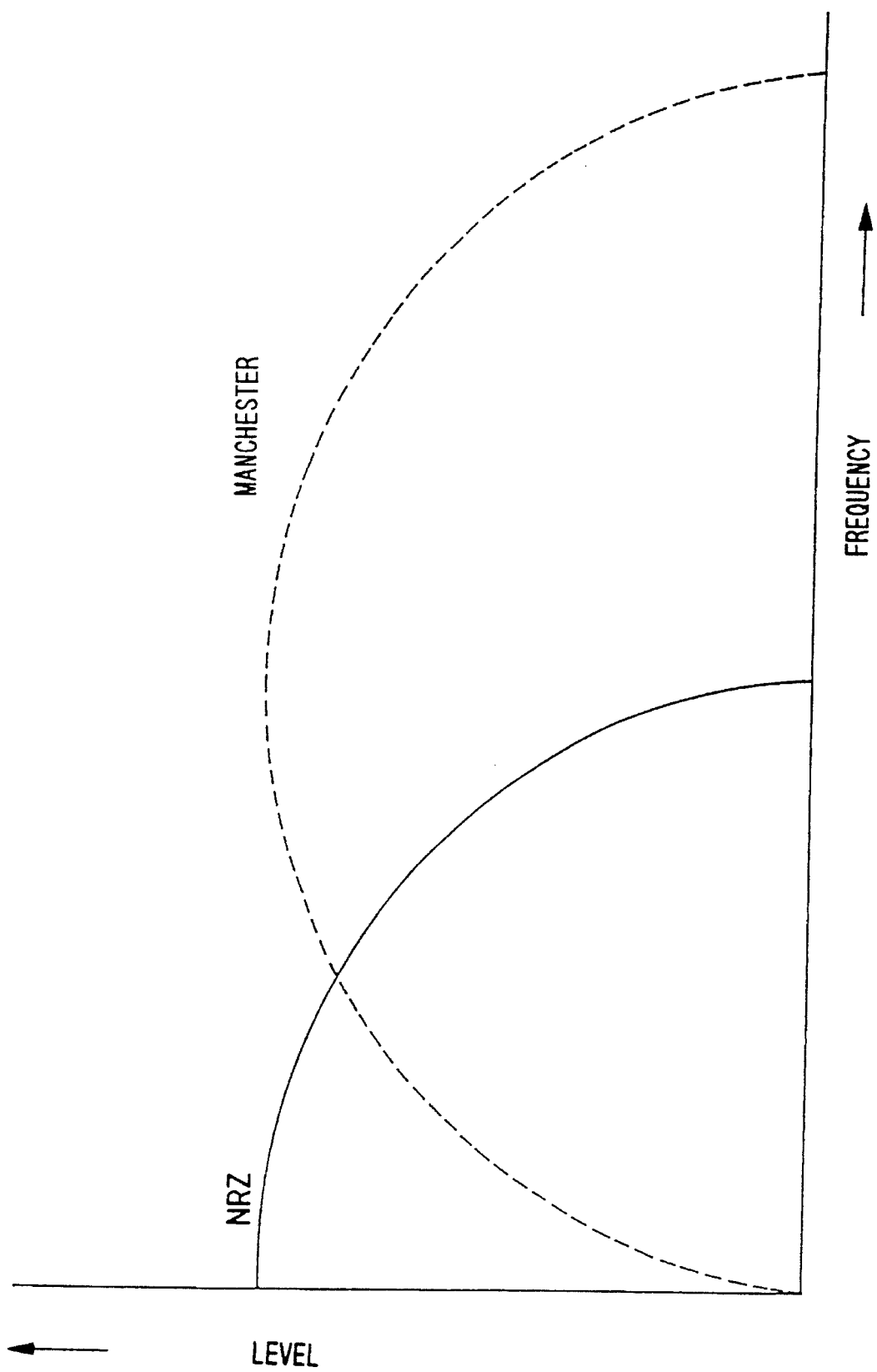
FIG. 14 is a graphical representation of a frequency spectrum of a Manchester coded signal shown in FIG. 13.

FIGS. 11 (a) and 11 (b) illustrate a manner of scanning carried out in the transmitting-receiving systems 42A or 42B shown in FIG. 10. In the first step, the transmitting-receiving system 42 scans every 2 degrees as one point in the horizontal direction until scans throughout a range of totaling 21 points equal to 40 degrees as shown in FIG. 11(a), then in the second step, it scans every 2 degrees as one point in the vertical direction until it scans throughout a range of totaling 21 points equal to 40 degrees as shown in FIG. 11(b). This manner enables a wide capture range for the automatic control, thus being highly accurate adjustment of the optical axis.

As stated above, the parabolic reflector of the transmitting means causes the light beams emitted from the light emitting element to be parallel so that the diameter of the light beams may be narrowed down. This enables long-distance optical radio transmission without occurrence of interference, even if plural sets of transmitting means employing light emitting elements are operatingly installed in parallel with each other, and also enables direct optical radio transmission of return-to-zero signals such as Manchester coded signals.

Figure 16A:
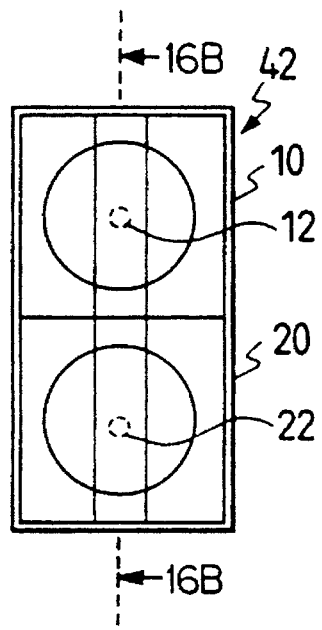
FIGS. 16($a$) through 16($c$) show an optical radio transmitting system according to this invention, where FIG. 16($a$) is a front view of the system, FIG. 16($b$) is a vertical sectional view of the same, and FIG. 16($c$) is a perspective view of the same.
Figure 16B:
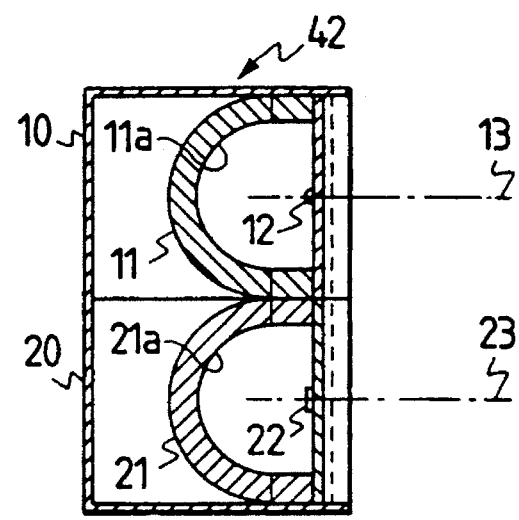
Figure 16C:
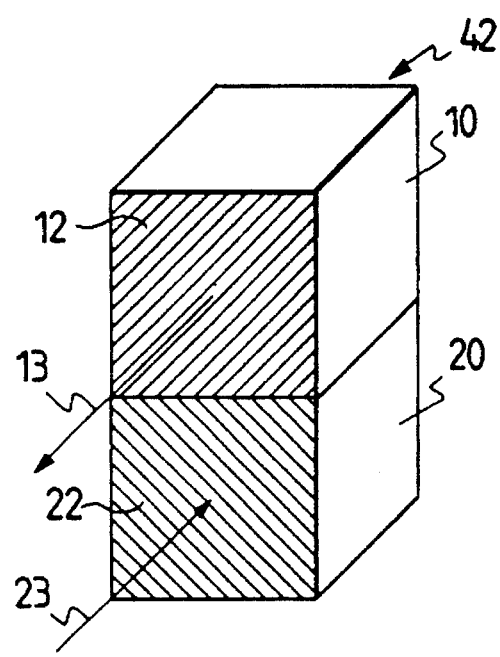

Referring now to FIGS. 16 through 20, there are shown first embodiment of this invention. FIGS. 16(a) through 16 (c) show a transmitter-receiver means 42. FIG. 16(a) is a front view of the transmitter-receiver means 42, FIG. 16(b) is a vertical sectional view thereof, and FIG. 16(c) is a perspective view thereof. The transmitter-receiver means 42 comprises a transmitter 10 and a receiver 20. The transmitter 10 substantially includes a parabolic reflector 11 having an inner reflective surface 11a, a light emitting element 12 positioned in a focal point of the parabolic reflector 11 or in a region closely surrounding the focal point, and a means (not shown) generating a signal to drive the light emitting element 12. The receiver 20 includes a parabolic reflector 21 having an inner reflective surface 21a, a light receiving element 22 positioned at a focal point of the parabolic reflector 21 or in a region closely surrounding the focal point, and a means (not shown) taking out information from output signals from the light receiving element 22. The transmitter 10 and the receiver 20 are integrally formed so that optical axis 13 of the parabolic reflector 11 of the transmitter 10 is parallel with that of the receiver 20. Infrared filter are attached on the front surfaces of both the transmitter 10 and the receiver 20.

Figure 17:
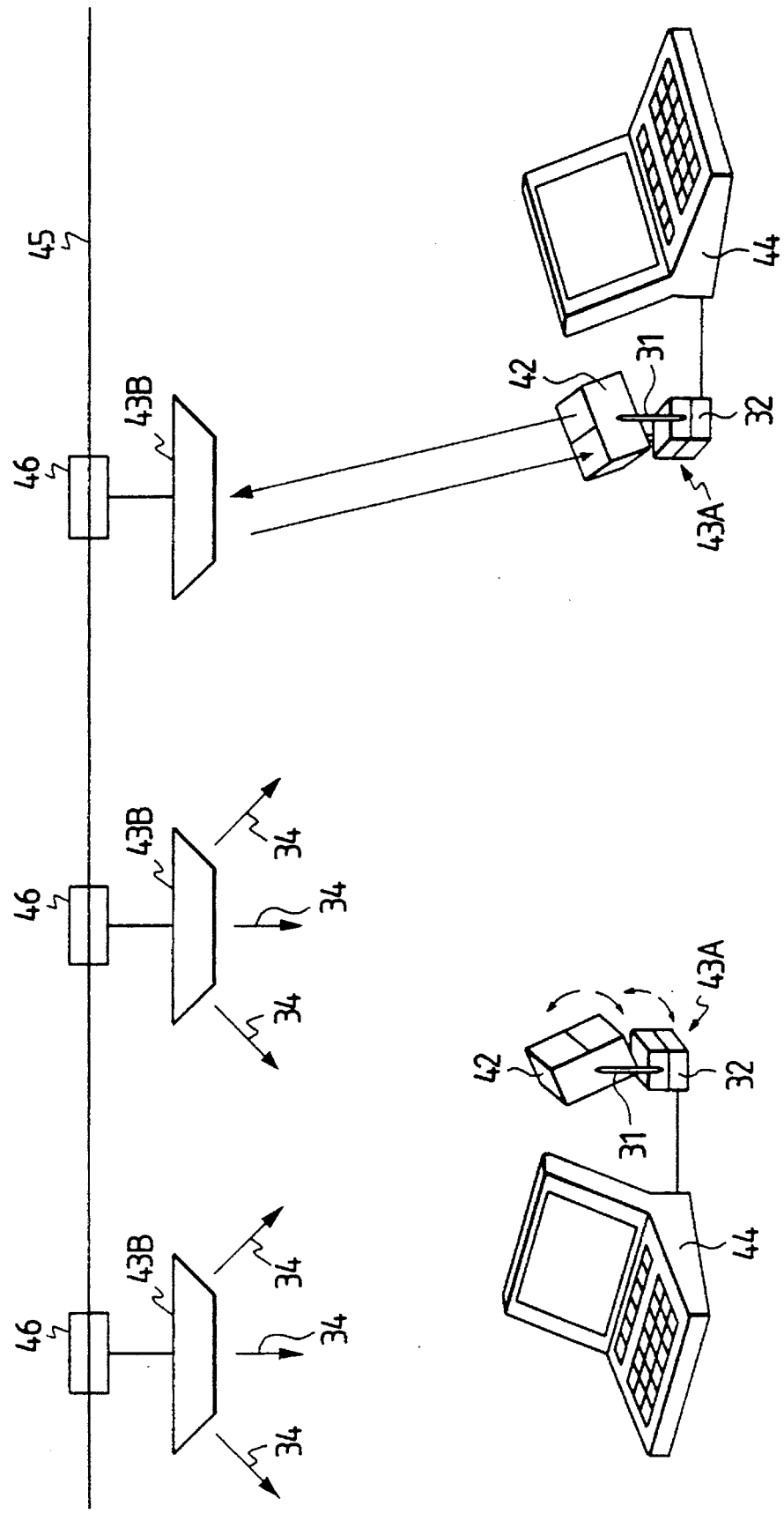

FIG. 17 shows an example of an optical radio transmission network where terminals of a plurality of personal computers 44 and Ethernet are connected through a transmitter-receiving means 42 shown in FIGS. 16(a) through 16(c).

Figure 18:
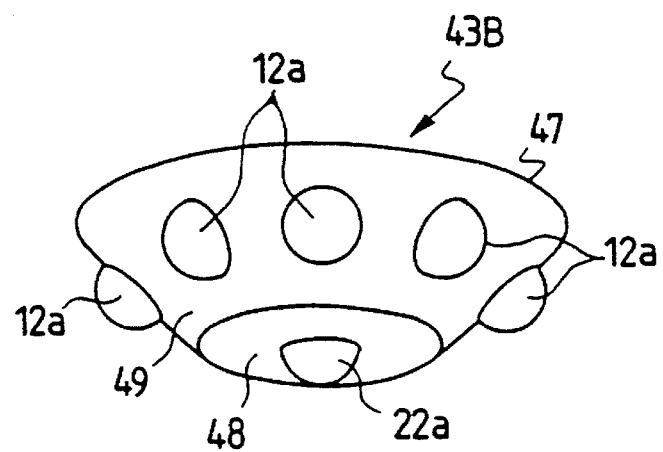
FIG. 18 is a perspective view of an optical radio transmitting system employed in the Ether network shown in FIG. 17.

In FIG. 17, a first optical radio transmitting system 43A is vertically and horizontally rotatably supported (refer to FIG. 22) so as to be capable of communicating in a desirable direction. The first optical radio transmitting system 43A is connected to a terminal of a personal computer 44 or the like. The Ethernet 45 is provided with a plurality of second optical radio transmission systems 43B, each of which has a transmitting part of a relatively wide-directivity as shown in FIG. 18, and each of which is connected to the Ethernet 45 through a corresponding transceiver 46. The second optical radio transmitting system 43B is generally in a shape of circular truncated cone, and is equipped with a light emitting element 22a on its bottom surface 48 and a plurality of light receiving elements 12a on its circumferential surface 49 as shown in FIG. 18. Each of the light emitting element 22a and the: light receiving elements 12a is mounted a convex lens. The light emitting elements 12a are driven in parallel and emit the same signal. As shown in FIG. 17, the personal computers 4 may be connected with the Ethernet via the first optical radio transmitting system 43A and the second optical radio transmitting system 43B over optical radio to communicate to each other.

Before initiation of the communication, it is necessary to appropriately adjust a direction of the optical axes 13 and 23 of the first optical radio transmitting system 43A to the second optical radio transmitting system 43B in order establish a communication path therebetween. The steps the adjustment is carried out as follows:

(1) One of the second optical transmitting system 43B that is in an idling state and does not currently have any established communication path with any first optical transmitting system 43A emits a carrier wave of a single frequency, for example 30 MHz, as guide beams downwardly to an approximately circular area, as shown in FIG. 17.

(2) When the personal computer 44 starts up, the optical radio transmitting system 43A that does not current 1 y have any established communication path initiates to shift its optical axes 13 and 23 in response to a command signal from the personal computer 44. The shift of the optical axes 13, 23 of the first optical radio transmitting system 43A is carried out by a vertically rotating mechanism 31 and a horizontally rotating mechanism 32 both attached to the optical radio transmitting system 43A. The rotating mechanisms 31, 32 are driven by suitable motors to automatically carry out the shift of the optical axes 13, 23. The steps of the automatic shift of the optical axes 13, 23 comprises:

(a) driving the vertically rotating mechanism 31 to make the optical axes 13, 23 that are aiming in the horizontal direction to sweep upwardly in the vertical direction until they reach the zenithal direction;

(b) turning clockwisely the optical axes 13, 23 2 degrees by the horizontally rotating mechanism 32;

(c) driving the vertically turning mechanism 31 to make the optical axes 13, 23 to sweep downwardly in the vertical direction until they aim at the horizon;

(d) again turning clockwisely the optical axes 13, 23 by 2 degrees by the horizontally rotating mechanism 32; and (e) repeating (a) through (d) ninety times. By carrying out the above steps (a) through (e), the first optical radio transmitting system 43A may automatically scan the upper hemispherical region by rotating itself 90 degrees in the vertical direction and 360 degrees in the horizontal direction.

Figure 19A:
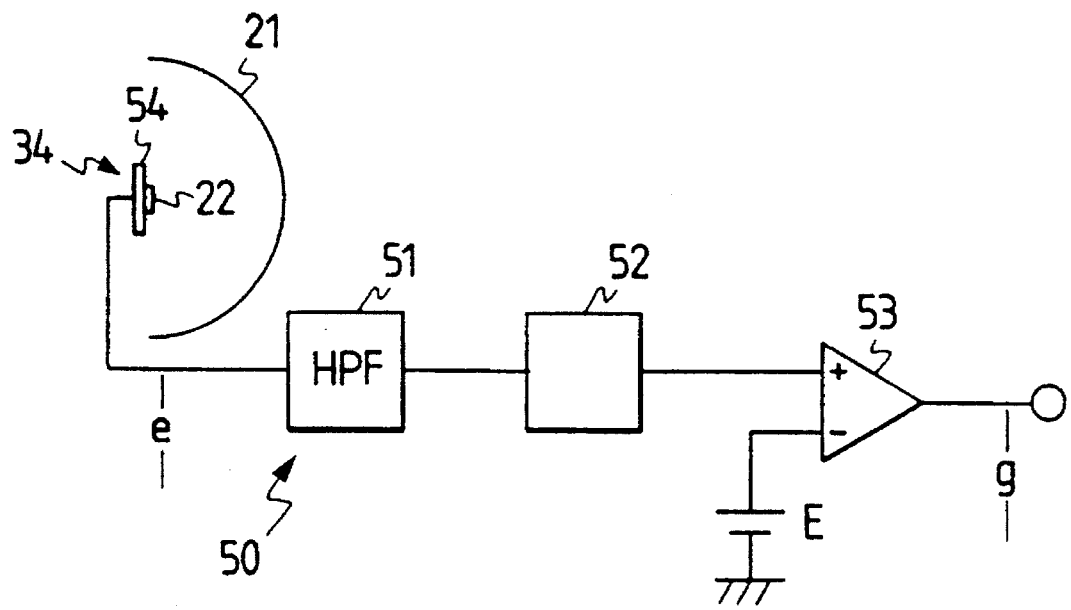
FIGS. 19($a$) and 19($b$) are circuit diagrams of a receiver of the optical radio transmitting system according to this invention, where FIG. 19($b$) is a circuit diagram of a substrate included in the receiver shown in FIG. 19($a$)
Figure 19B:
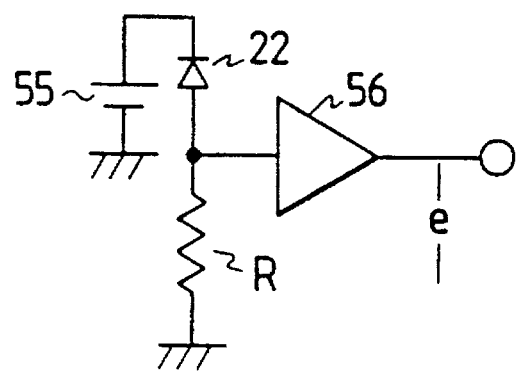

(3) The first optical radio transmitting system 43A detects the guide beams during the scanning operation. As shown in FIG. 19(a), the guide beams 34 are received by a light receiving part 50 of the first optical radio transmitting system 43A, which light receiving part 50 includes a light receiving element 22 and a substrate 54 the light receiving element 22 mounted thereon having a circuit shown in FIG. 19(b), are fed as an output signal (e) to a highpass filter 51, and converted into a DC voltage at a light intensity level detector 52 to be compared with a predetermined value E by a comparator 53, and outputted as an output signal (g). FIG. 19(b) is a circuit diagram of the substrate 54 attached to the light receiving element 22 thereon, where a terminal of the light receiving element 22 is connected to a reverse bias voltage source 55 and the other terminal of the light receiving element 22 is connected to a resistor R and an amplifier 56. A terminal voltage of the resistor R is amplified by the amplifier 56 to detect a light current of the light receiving element 22 to be outputted as a detected signal e.

Figure 21:
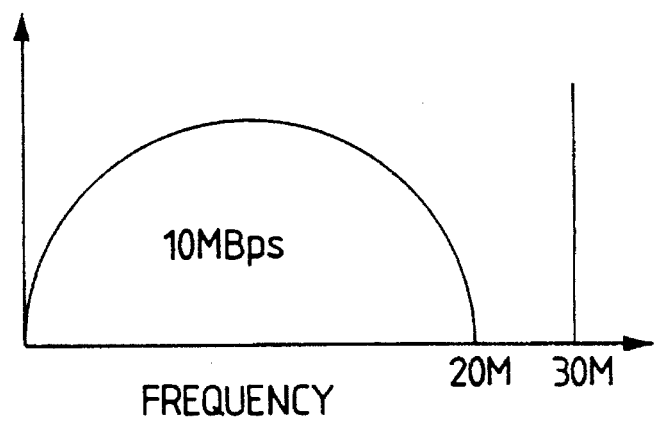
FIG. 21 is a graph showing a spectrum of a signal used in the optical radio transmission system according to this invention.

Meanwhile, the optical radio transmitting system according to this embodiment of this invention transmits data in a form of Manchester coded signals at 10 MBps as generally employed in the Ethernet communication. The Manchester coded signal requires a frequency spectrum up to approximately 20 MHz as shown in FIG. 21. The guide beams 34 emitted from the second optical radio transmitting system 43B are set at a frequency spectrum of, for example, 30 MHz, higher than the Manchester coded signal so that the optical radio transmitting means 43A including the highpass filter 51 may detect only the guide beams 34.

In FIG. 17, only when the optical axes 13, 23 of the first optical radio transmitting system 43A are directed to the second optical radio transmitting system 43B emitting the guide beams 34 during the scanning operation, does the light receiving part 50 of the first optical radio transmitting system 43A output a signal in a high level (H) as a result of the detection of the guide beams 34 because of a narrow directly of the light receiving means 20A. When recognizing the detection of the light beams 34, the first optical radio transmitting system 43A immediately gets into a state of establishment of the optical path. More specifically, when the optical axis 23 of the receiving means 20A of the first optical radio transmitting system 43A is adjusted, the optical axis 13 of the transmitting means 10A is simultaneously in the adjusted state, resulting in establishment of the optical paths for both the transmission and reception.

At the moment that the light receiving part 50 of the first optical radio transmitting system 43A outputs a detected signal in a H level that represents detection of the guide beams 34, the first optical radio transmitting system 43A stops sweeping in the horizontal direction and locks its direction. Or, the first optical radio transmitting system 43A stores a coordinate value of the scanning position in a memory in the rotating mechanism controller 30 at the time that the output signal for the detection of the guide beams 34 becomes a H level, then the first optical radio transmitting system 43A itself directs to the second optical radio transmitting system 43B in accordance with the coordinate value stored in the memory of the turning mechanism controller 30 after completion of the scanning operation to establish the optical communication path therebetween.

According to the latter manner, it is possible to store in prior coordinate values representing the locations of a plurality of second optical radio transmitting systems 43B in the memory of the first optical radio transmitting system 43A. It is thus possible to quickly reestablish the optical path between the first optical radio transmitting systems; 43A and any second optical radio transmitting system 43B by directing the optical axes 13, 23 to another second optical radio transmitting system 43B if the optical communication path is cut out with some obstruction.

(4) When the optical communication line is established between the first and the second optical radio communication systems 43A, 43B, the first optical radio transmitting system 43A transmits signals to the second optical radio transmitting system 43B. Upon reception of the signals transmitted from the first optical radio transmitting system 43A, the second optical radio transmitting system 43B recognizes the establishment of the communication path and stops emission of the guide beams 34 and get into a communication state.

In the above optical radio communication network, the first optical radio transmitting system 43A converts signals supplied from the personal computer 44 at a low bit rate, then transmits them at 10 MBps on an optical radio wave. The transmission of the signals therefore becomes intermittent. Such intermittent signals sometime cause the second optical radio transmitting system 43B to fail recognition of establishment or non-establishment of the communication path since the second optical radio communication system judges it with presence of the optical signals. To avoid such misjudgement, a single frequency carrier wave of, such as, 2.5 MHz is inserted during which no signal is present in this optical radio communication network according to this invention. In this optical radio communication network, since the objective party of the communication is unspecific, a reception level of transmitted signal in the receiving part tends to vary largely. It is therefore necessary to control the reception level of the transmitted signal through automatic gain control (AGC). Transmission of non-intermittent signals in a manner above-mentioned may allow a large time constant of AGC, providing a stable AGC.

Figures 22A, 22B:
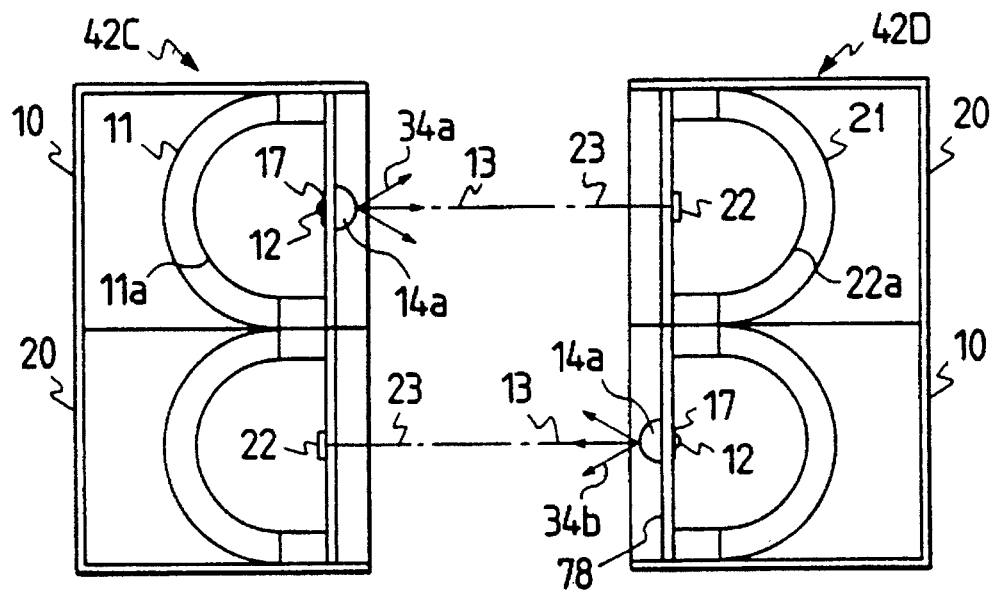
FIGS. 22($a$) and 22($b$) are vertical sectional view of a pair of optical radio transmitting systems according to another embodiment of this invention.
Figure 23:
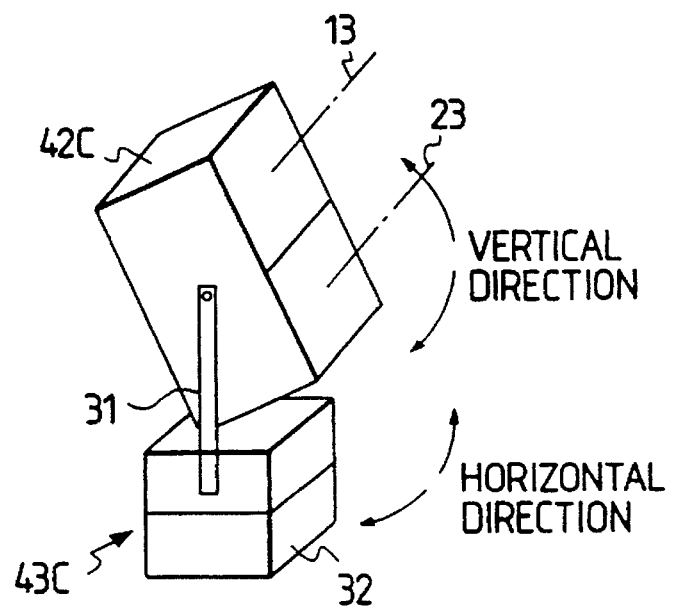
FIG. 23 is a perspective view of one of the optical radio transmitting systems shown in FIG. 22(a) with vertically and horizontally rotating mechanisms.

FIGS. 22 through 24 illustrate a second embodiment according to the present invention.

FIGS. 22 (a) and 22 (b) show a pair of optical radio transmitting systems 42C and 42D of the identical structure. By way of example, the first optical radio transmitting system 42C comprises a transmitting means 10 and a receiving means 20. The transmitting means 10 includes a parabolic reflector 11 having an inner reflective surface 11a, a light emitting element 12 positioned at a focal point of the parabolic reflector 11 or in a region closely surrounding the focal point and a means for driving the light emitting element 12 with a signal to be transmitted. The receiving means 20 includes another parabolic reflector 21, a light receiving element 22 positioned at a focal point of the parabolic reflector 21 or in a region closely surrounding the focal point, and a means for taking out information from output signals of the light receiving element 22. The transmitting means 10 and the receiving means 20 are integrally so formed upon assembly that optical axes 13 and 23 of the transmitting means 10 and the receiving means 20 are in parallel with each other. In this embodiment, these systems 42C, 42D are used for optical radio duplex communication.

A light emitter 14a of a relatively wide directivity is provided in the vicinity of a light path of the transmitting means 10 of each of the first and the second optical radio transmitting systems 42C, 42D, as shown in FIGS. 22 (a) and 22 (b).

Referring to FIG. 23, each of the first and the second optical radio transmitting systems 43C, 43D is so supported by a vertically rotating mechanism 31 and a horizontally rotating mechanism 32 as to be rotatable in both vertical and horizontal directions in order to communicate in any desired direction.

FIG. 24 illustrates an example of an optical radio visual telephone system employing the first and the second optical radio transmitting systems 42C, 42D. Each of the first and the second optical radio transmitting systems 42C, 42D is connected to a television camera 57 as an input device and to a television monitor 58 as an output device. For example, the television camera 57 outputs video and audio signals to the first optical radio transmitting systems 43C, the optical radio transmitting system 43C applies frequency modulation on the video and audio signals to transmit them to the second optical radio transmitting system 43D. The second optical radio transmitting system 43D demodulates the incoming video and audio signals to supply them to the monitor 58. The above process is simultaneously carried out in both the first and the second optical radio transmitting systems 43C, 43D.

As shown in FIGS. 22(a) and 22(b), the light emitter 14a formed with, for example, light emitting diode (LED) and a convex lens mounted thereon is attached in the vicinity of the transmitting means 10 of both the first and the second optical radio transmitting systems 43C, 43D. The transmitting means 10 comprises the parabolic reflector 11, a substrate 17 for the light emitting element 12 and a substrate supporting bar 18. The LED as the light emitting element 12 is mounted on the rear surface of the substrate 17. It is preferable that the light emitter 14a of a wide directivity is placed on the front surface of the transmitter, just opposing to the light emitting element 12 across the substrate supporting bar 18.

To establish a communication path between the first and the second optical radio communication systems 43C, 43D, it is necessary to adjust and coincide optical axes 13 and 23 of the transmitting means 10 and the receiving means 20 with each other. A manner to establish the adjustment will be described hereinafter.

(1) The light emitter 14a of a wide-directivity of the first optical radio transmitting system 43C constantly radiates guide beams 34a of a single frequency carrier wave of, for example, 30 MHz used for the adjustment. The light emitter 14a of a wide-directivity of the second optical radio transmitting system 43D also constantly radiates guide beams 34b of a single frequency carrier wave of, for example, 25 MHz.

Figure 20A:
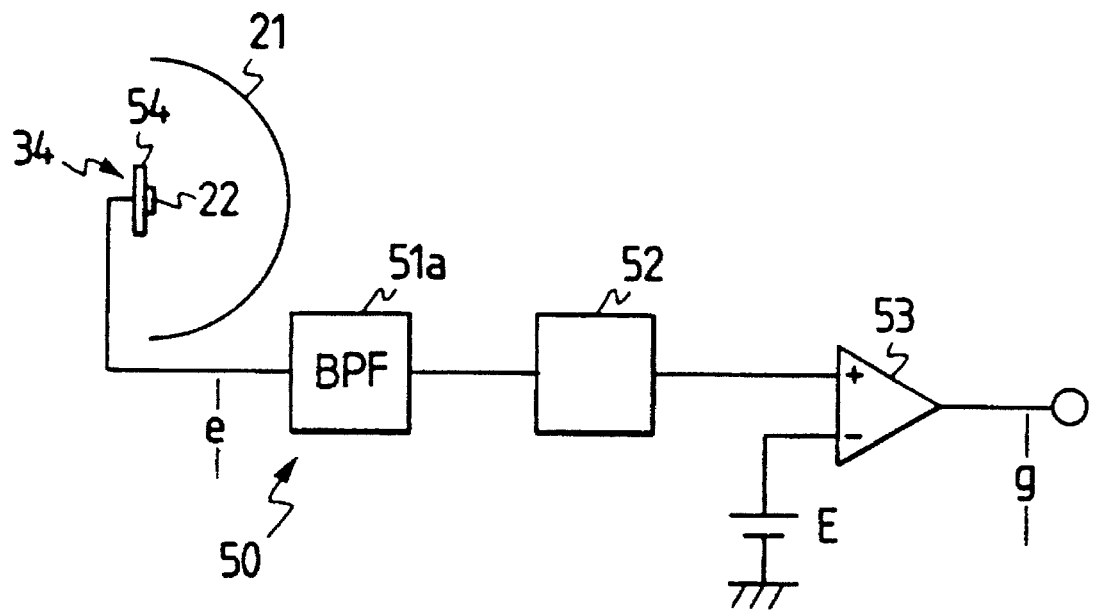
FIG. 20($a$) is another circuit diagram of a receiver of the optical radio transmitting system according to this invention, where FIG. 20($b$) is a circuit diagram of a substrate included in the receiver shown in FIG. 20($a$)
Figure 20B:
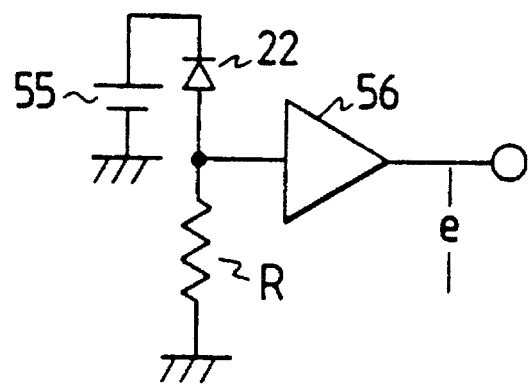

(2) A receiving means 20C of the first optical radio transmitting system 43C may receive video signals and the guide beams 34b from the second optical radio transmitting system 43D. But, when the optical axes 13 and 23 of the transmitting means 10 and the receiving means 20 of the first and the second optical radio transmitting systems 43C, 43D are deviated from each other, the receiving means 20 of the first optical radio transmitting system 43C cannot receive either the video signals or the guide beams 34. To avoid such situation, each of the first and the second optical radio transmitting means is provided with a detecting circuit 52 for detecting a level of incident guide beams, as shown in FIG. 20(a). The detecting circuit 57 shown in FIGS. 20(a) and 20(b) is identical with the detecting circuit shown in FIGS. 19(a) and 19(b) except that the highpass filter 51 is replaced with a bandpass filter 51a. The detecting circuit 57 extracts only components of 25 MHz through a bandpass filter 51a from a signal received by the receiving means 20, and a signal intensity level detecting circuit 52 converts an output signal from the highpass filter 51 into a direct current voltage to apply it to an input terminal of a comparator 53. To the other input terminal of the comparator 53 is applied a predetermined voltage (E) for comparison with the voltage applied from the signal intensity level comparator 52. When the level of the received guide beam 34 is lower than the predetermined value (E), the comparator 53 makes a judgement as to the optical axes 13 and 23 being out of coincidence, and outputs a signal in a low level (L signal).

When the comparator 53 outputs a L signal, the first optical radio transmitting system 43C initiates shifting operation of the optical axes 13, 23 of itself.

The shift of the optical axes 13, 23 is carried out by the vertically rotating mechanism 31 and the horizontally rotating mechanism 32 both attached to the system. The both turning mechanisms 31, 32 are driven by suitable respective motors. A manner of the shift is as follows:

(a) driving the vertically turning mechanism 31 to cause the optical axes 13, 23 to shift from an angle of −30 degree to an angle of +30 degree with respect to the horizontal plane;

(b) moving, for example, clockwisely the optical axes 13, 23 2 degrees in the horizontal direction by the horizontally rotating mechanism 32;

(c) driving again the vertically turning mechanism 31 to cause the optical axes 13, 23 to shift from an angle +30 degrees to an angle of −30 degrees;

(d) moving clockwisely the optical axes 13, 23 by 2 degrees in the horizontal direction by the horizontally rotating mechanism 32; and (e) repeating the steps (a) through (d) 15 times.

According to the above manner, the first optical radio transmitting system 32C turns from +30 to −30 degrees in the vertical direction and 60 degrees in the horizontal direction to automatically scan throughout a range of 60 degrees in the vertical and horizontal directions.

During the scanning operation, only when the optical axes 13, 23 of the first optical radio transmitting system 43C are aimed at the second optical radio transmitting system 43D, the detecting circuit 50 outputs a signal in a high level as a result of detection of the guide beams 34 because of the narrow-directivity of the receiving means 20C of the first optical radio transmitting system 43C. When the H signal is outputted, the first optical radio transmitting system 43c recognizes detection of the light beams 34 and is simultaneously steps into a state where communication paths for both transmission and reception are established, since the optical axes 13, 23 of the transmitting means 10 and the receiving means 20 are parallel to each other.

The first optical radio transmitting system 43C steps scanning operation at the moment when an output signal from the detecting circuit 50 becomes H and locks its direction.

As appreciated from the above description, adjustment of the optical axes 13, 23 of the second optical radio transmitting system 43D is carried out in the same manner. It is, however, noted that since the guide beams 34a radiated from the second optical radio transmitting system 43D is in a frequency of 25 MHz, the first optical radio transmitting system 43C should be provided with a bandpass filter 51a in the detecting circuit 50 suitable to the frequency of the light beams 34. Why a frequency of the guide beam 34b of the first optical radio transmitting system 43C is different from that of the second optical radio transmitting system 43D is to avoid erroneous operation of the detecting circuit 50 that is caused of feedback light beams due to reflected light or the like radiated from itself.

The first embodiment is an example of an optical LAN system and the second embodiment is an example of an optical visual telephone communication, both employing the optical radio transmitting systems according to the present invention therein. It should be noted that the optical radio transmitting systems and the method for adjusting the optical axes of the system are applicable to the various and many fields. For example, the system in the first embodiment is applicable to concentration of monitor cameras, or the system in the second embodiment is applicable to duplex data communication between buildings.

According to the above first embodiment, the optical radio transmission network includes a first and a second optical radio transmitting systems, each of which comprises a transmitting means including a first parabolic reflector having an inner reflective surface, a light emitting element positioned at a focal point of the first parabolic reflector or in a region closely surrounding the focal point of the first parabolic reflector and a means for driving the light emitting element with signals to be transmitted, and a receiving means including a second parabolic reflector having an inner reflective surface, a light receiving element positioned at a focal point of the second parabolic reflector or in a region closely surrounding the focal point of the second parabolic reflector, the transmitting means and the receiving means being integrally so formed that optical axes of the first and second parabolic reflectors are in parallel to each other, where the transmitting means of the second optical radio transmitting system is of a relatively wide directivity or the second optical radio transmitting system is further provided with a projector in the vicinity of the transmitting means. In the above system, the transmitting means of the second optical radio transmitting means or the projector emits guide beams useful to adjust an optical axis of the receiving means of the second optical radio transmitting means. The receiving means of the first optical radio transmitting means receives the guide beams emitted from the second optical radio transmitting means by changing a direction of an optical axis of the parabolic reflector of the first optical radio transmitting means, whereby adjustment of the optical axis of the first optical radio transmitting means on the basis of a level of the incident guide beams may readily completed. Provision of a motor or the like to the optical radio transmitting system enables automatic optical axis adjustment.

It is possible to form an optical radio transmission network with one or a plurality of the first optical radio transmitting means and one or a plurality of the second optical radio transmitting means. In the above network, each of the optical radio transmitting system may be connected to a terminal device such as a computer. It is thus possible to automatically search an objective company that is not being occupied under the control of the computer upon start up of the computer in order to establish a communication path.

This invention is directed to solve the difficulty in adjustment of the optical axis of the system, and to enable a long distance, high speed, optical radio data communication.

According to the second embodiment of this invention, an optical radio duplex data communication network includes a first and second optical radio transmitting systems, each of which comprises a transmitting means including a first parabolic reflector having a inner reflective surface, a light emitting element positioned at a focal point of the first parabolic reflector or in a region closely surrounding the focal point of the first parabolic reflector and a means for driving the light emitting element with signals to be transmitted, and a receiving means includes a second parabolic reflector having an inner reflective surface, a light receiving element positioned at a focal point of the second parabolic reflector or in a region closely surrounding the focal point of the second parabolic reflector, and a means for talking out information from output signals of the light emitting element, the transmitting means and the receiving means being integrally so formed that optical axes of the first and the second parabolic reflectors are in parallel to each other. In the above network, each of the first and second optical radio transmitting system is provided with a projector of a relatively wide directivity in the vicinity of its transmitting means. The projector of the first optical radio transmitting system emits a first guide beam effectively used for adjustment of the optical axis, while the projector of the second optical radio transmitting system emits a second guide beam, said first guide beam has a carrier frequency different from that of the second guide beam. Each of the first and the second optical radio transmitting system is also provided with a light receiving part to receive the guide beams emitted from corresponding projector. The optical radio transmitting systems of a narrow-directivity may readily adjust their optical axes on the basis of a level of incident guide beams.

It is possible to provide an optical axis shifting mechanism driven by a motor or the like similar to the rotating mechanism described hereinbefore to the optical radio transmitting system to carry out an automatic adjustment of the optical axis.

The optical radio transmitting system can receive guide beams emitted from the objective system because of a wide directivity of the guide beams, even if optical axes of the two systems do not coincide with each other. The optical radio transmitting system may individually scan the incident guide beams, thereby adjusting the optical axis on the basis of an intensity level of the incident guide beams. By providing a different carrier frequency to the guide beams of the respective systems, it is possible for the system to recognize whether the guide beams emitted from the objective system or emitted by itself and returning to its light receiving means due to reflection or the like, thereby accurately carrying out the adjustment of the optical axis.

When intending to carry out an optical radio communication between the above two systems, only rough and manual adjustment of the optical axis of the systems is sufficient to establish a communication path therebetween even if the communication is in a long distance.

Figure 25C:
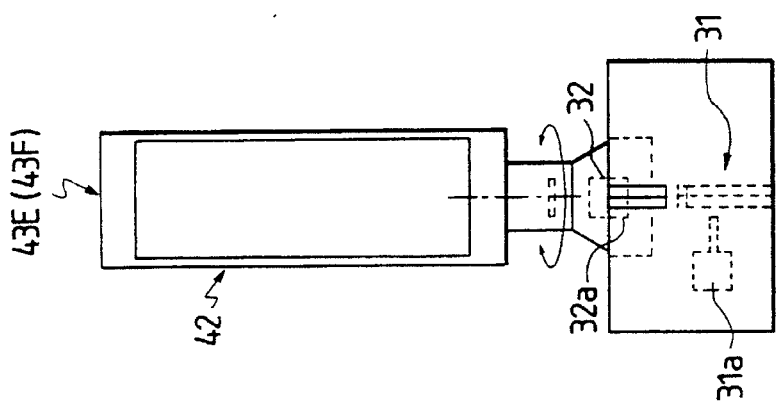
FIGS. 25(a) through 25(c) show a pair of optical radio transmission systems according to still another embodiment of this invention, where
Figure 25B:
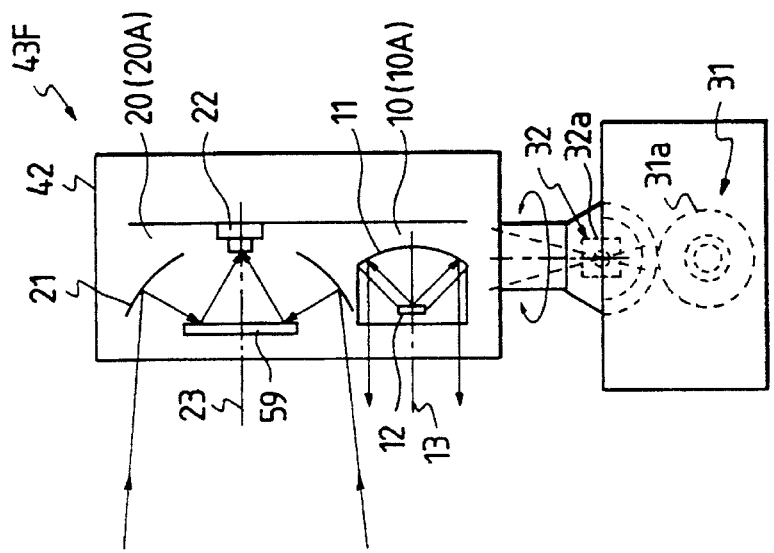
Figure 25A:
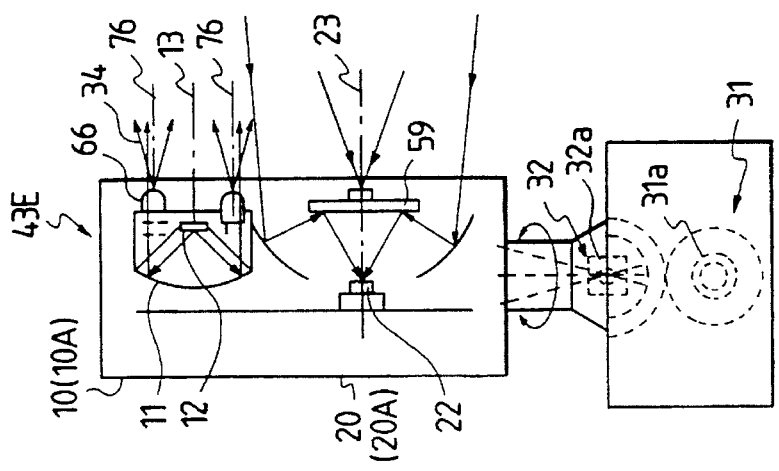
Figure 26A:
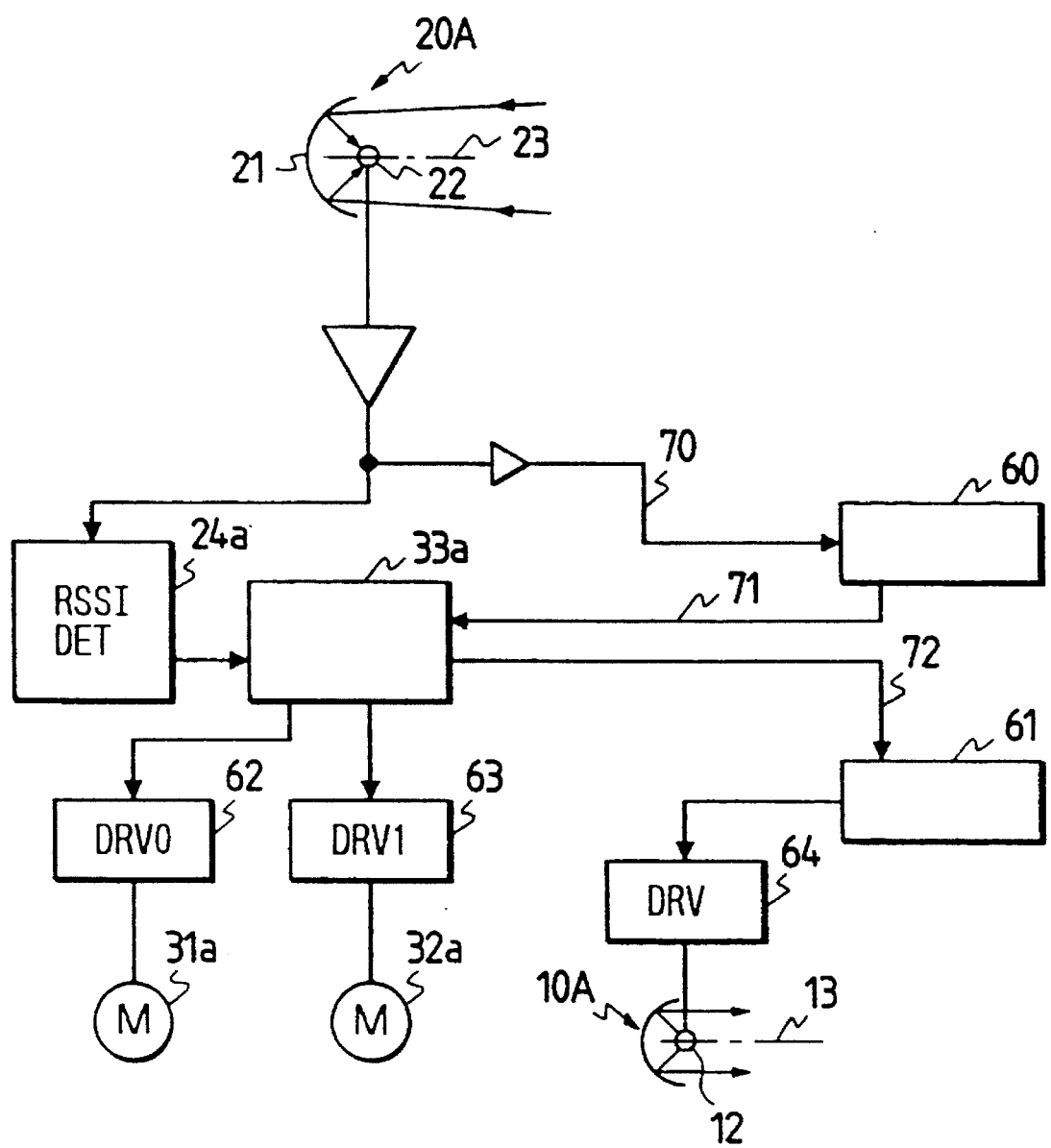
Figure 26B:
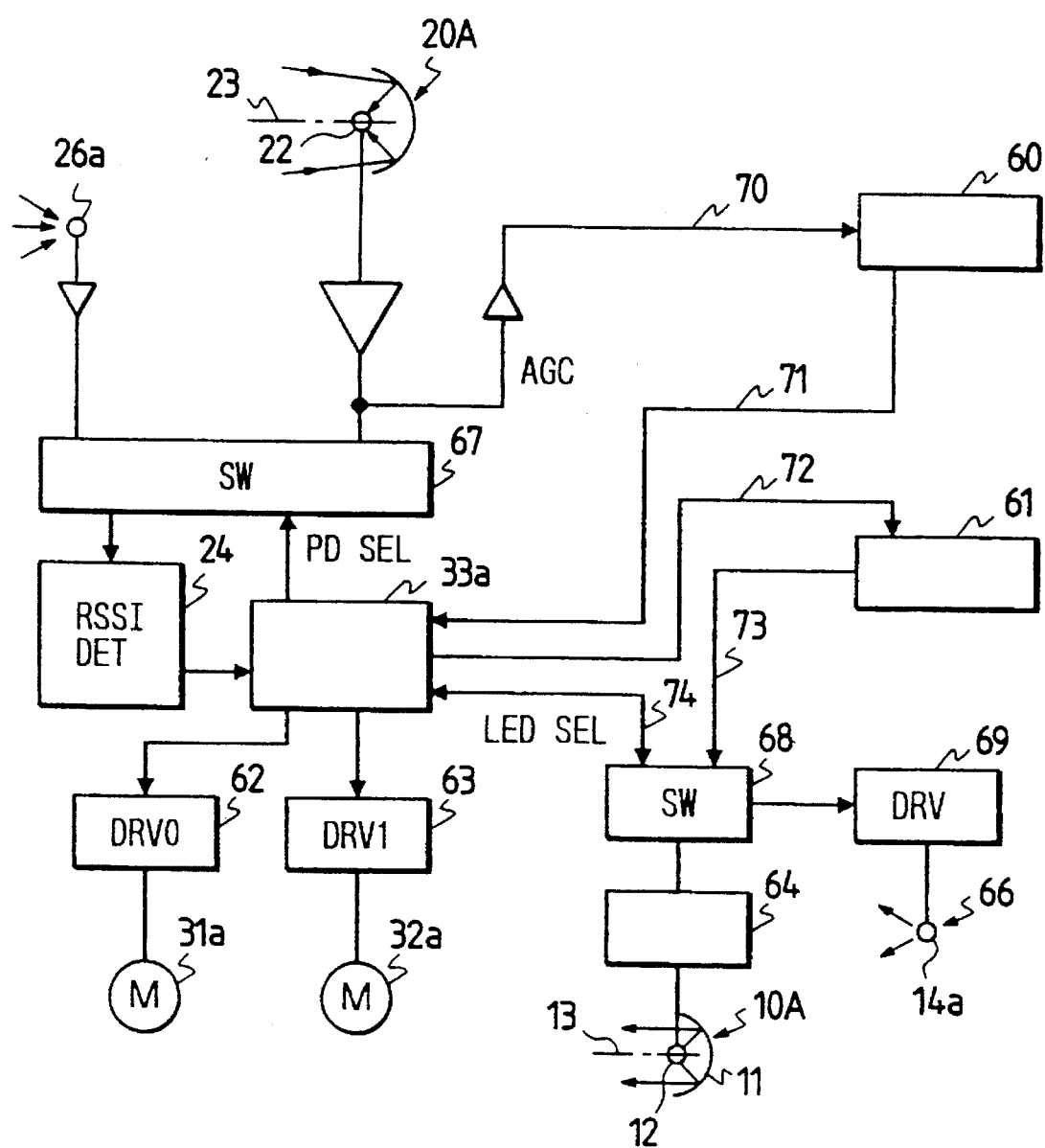
Figure 27A:
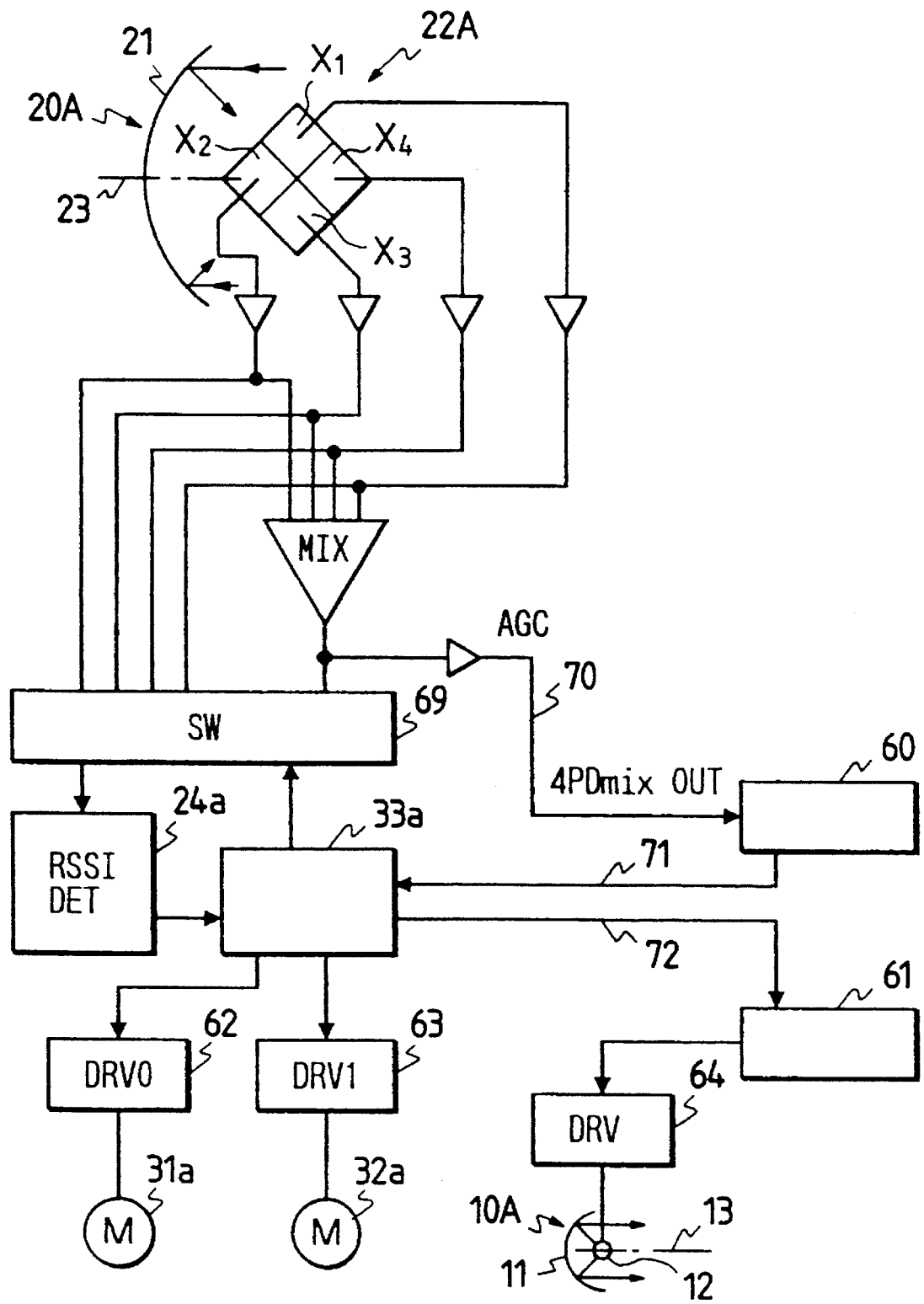
FIG. 27(a) and 27(b) are circuit diagrams of a pair of optical radio transmitting systems according to still another embodiment of this invention, where a light receiving element divided into four sections are employed.
Figure 27B:
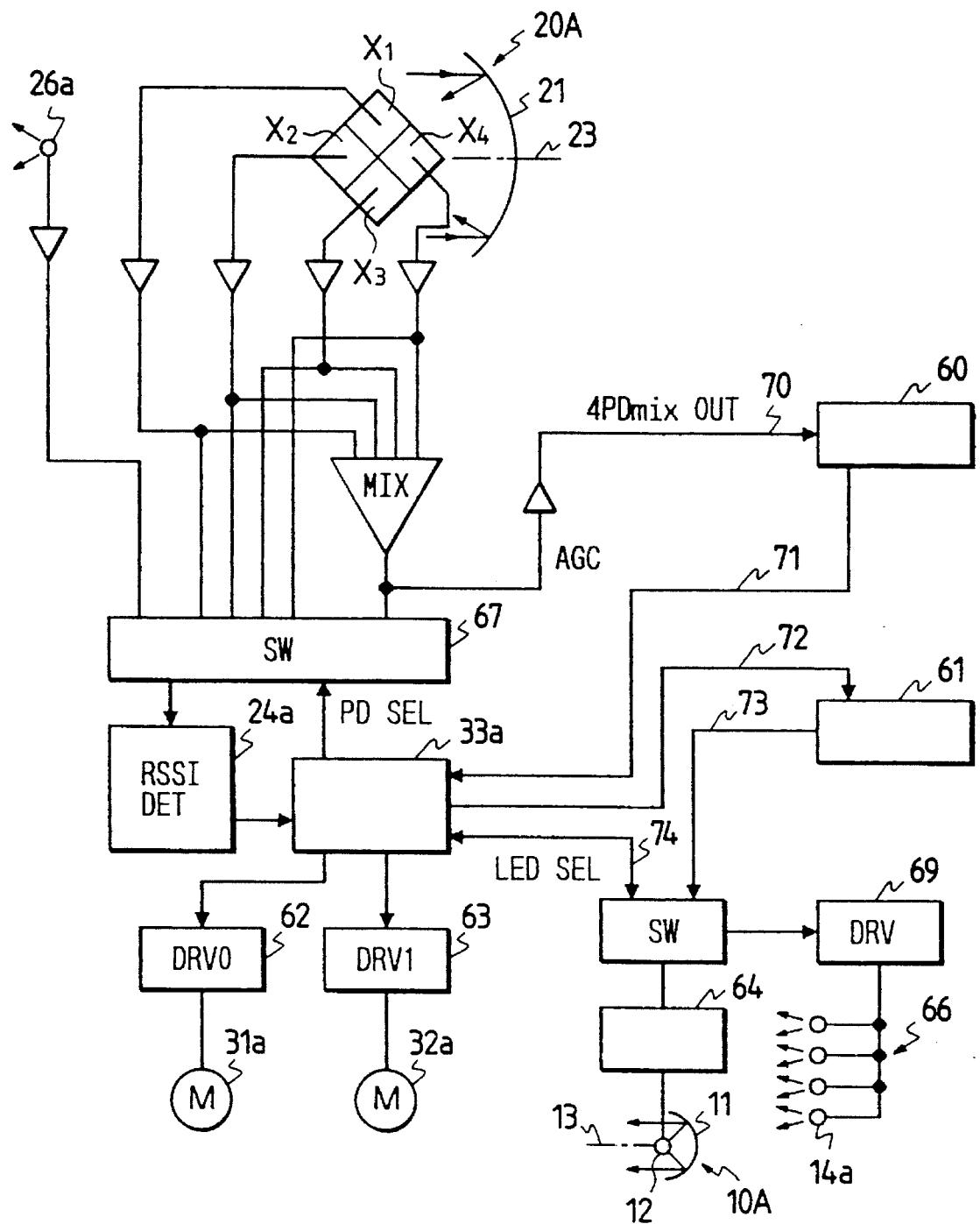

Referring now to FIGS. 25 through 27, there is shown a third embodiment of an optical radio transmitting system and a method for adjusting optical axes of the systems. FIG. 25(a) is a vertical sectional view of a first optical radio transmitting system, FIG. 25(b) is also a vertical sectional view of a second optical radio transmitting system that is in opposite to the optical radio transmitting system of FIG. 25(a), the two systems operating as a pair to enable optical radio transmission therebetween, and FIG. 25 (c) is a front view of either the first or the second optical radio transmitting system of FIG. 25(a). The two both optical radio transmitting systems shown in FIGS. 25(b) and 25(b) have a front view quite similar with each other, excepting their inner arrangement of a transmitting means and a receiving means.

Each of the first and the second optical radio transmitting systems 43E, 43F has an optical transmitting means 10 and an optical receiving means 20 of structures substantially the same with that of optical radio transmitting systems 43A through 43D. Thus, detailed descriptions of the structure of the transmitting means 10 and the receiving means 20 are abbreviated here.

Each of the optical radio transmitting system 43E, 43F is rotatably supported by a vertically rotating mechanism 31 which drives the optical radio transmitting system in a vertical direction and a horizontally rotating mechanism 32 which drives the same in a horizontal direction, both of which are respectively rotatably driven by driving motors 31a and 32a.

The transmitting means 10 is provided with a projector 66 of a wide-directivity emitting guide beams 34, and the receiving means 10 is provided with a light receiver 26a of also a wide-directivity. A parabolic reflector 21 of the receiving means 20 has a diameter larger than that of a parabolic reflector 11 of the transmitting means 10. In addition, the receiving means 20 is provided with a reflecting mirror 59 which serves to fold the incident light beams to keep the focal point of the parabolic reflector 21 having the larger diameter within a casing of the optical radio transmitting system 42F, thus the light receiving element 22 is positioned at the focal point formed with a combination of the parabolic reflector 21 and the reflecting mirror 59.

The parabolic reflector 11 of the transmitting means 10 has a directivity wider than that of the light emitting means 10, as shown in FIG. 35(b).

FIG. 26(a) is a circuit diagram of the first optical radio transmitting system 43E, and FIG. 26(b) is a circuit diagram of the second optical radio transmitting system 43F.

As shown in FIG. 26(a), the first optical radio transmitting system 43E comprises a narrow angle light receiving part 20A including the light receiving element 22 and the second parabolic reflector 21, a narrow angle light emitting part 10A including the light emitting element 12 and a first parabolic reflector 11, a light receiving part 60 receiving and processing transmitted data, a light transmitting part 61 processing and transmitting data to be transmitted, a RRSI converter 24a similar to the light intensity level detector 24 converting the received guide beams into a direct current according to a level of an intensity of the received guide beams, a controller 33a including a microcomputer controlling the whole system, driving circuits 62, 63 driving the motors 31a, 32a for the vertically rotating mechanism 31 and the horizontally rotating mechanism 32, respectively, and another driving circuit 64 driving the light emitting element 12.

As shown in FIG. 26(b), the second optical radio transmitting system 43F further includes, in addition to the same circuits and elements to the first optical radio transmitting system 43E, a wide angle light receiving part 65 including a wide angle light receiver 26a, a wide angle light emitter 66 including a wide angel light emitter 14a, a switch 67 switching a level of received light to be supplied to the RSSI converter 24a, and another switch 68 carrying out a switching between the light emitting elements 11 of the wide angle light emitting means 14a and the narrow angle light emitting means 10A. It is preferable that an automatic gain control (AGC) circuit 70 is interposed between an output of the narrow angle light receiving means 20A and the receiving part 60.

The receiving part 60 feeds a guide beam enabling signal to the con,roller 33a, and the controller 33a feeds a guide beam requesting signal to the transmitting part 61.

The switch 68 between the two light emitting elements 12, 14a of the second optical radio transmitting system 43F operates responsive to a signal 73 from the transmitting part 61 and a selection signal 74 from the controller 33a.

As shown in FIGS. 25(a) and 25(b), each of the first and the second optical radio transmitting systems 43E, 43F may be rotated about a fulcrum ±15° in both the vertical and horizontal directions. The optical axes 13, 23 of the narrow angle emitting means 10A and the narrow angle receiving means 20A, and the optical axes 75, 76 of the wide angle emitting means 66 and the wide angle receiving means 65 all are aimed to the same direction, thus the four optical axes are integrally moved. In the narrow angle emitting means 10A, light beams emitted from the light emitting means such as a chip LED are reflected by the parabolic reflector 11 to as to travel approximately in parallel, while the parabolic reflector 21 of the narrow angle receiving means 20A gathers only light beams perpendicular to or almost perpendicular to the light receiving element 22, the light receiving element 22 then receives such light beams. It is preferable that the wide angle light emitting means 14a attached to the second optical radio transmitting system 43F is a light emitting diode (LED) having a directive angle of ±15° or wider and a uniform luminous characteristic, and the wide angle light receiving means 26a of the wide angle receiving part 65 is a pin photodiode (PD) having a directive angle of ±15° or wider and a uniform receiving characteristic.

Figure 28A:
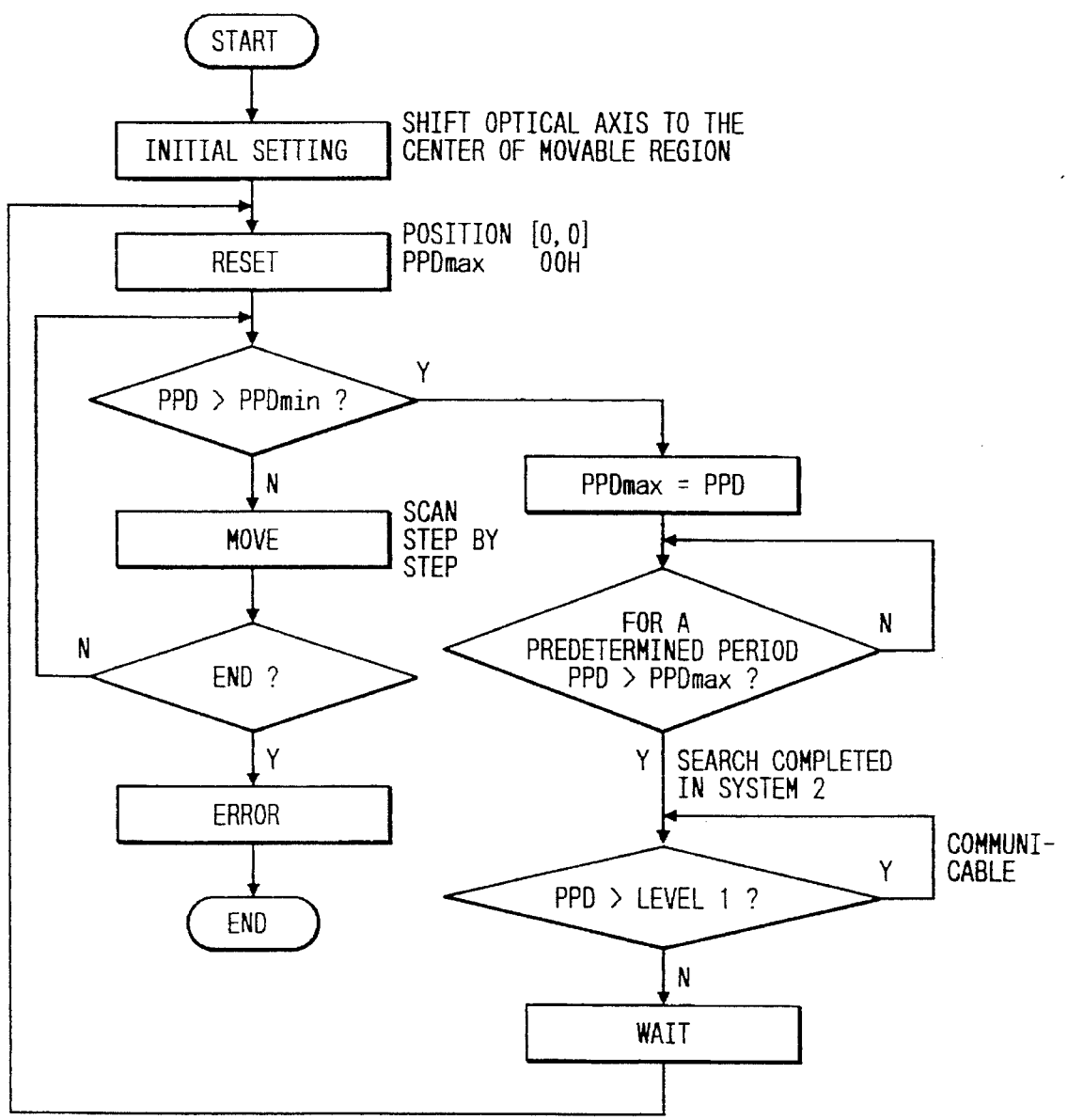
FIGS. 28(a) and 28(b) are flowcharts for conducting a method for adjusting optical axes of the optical radio transmitting systems shown in FIGS. 26(a) and 26 (b) according to this invention.
Figure 28B:
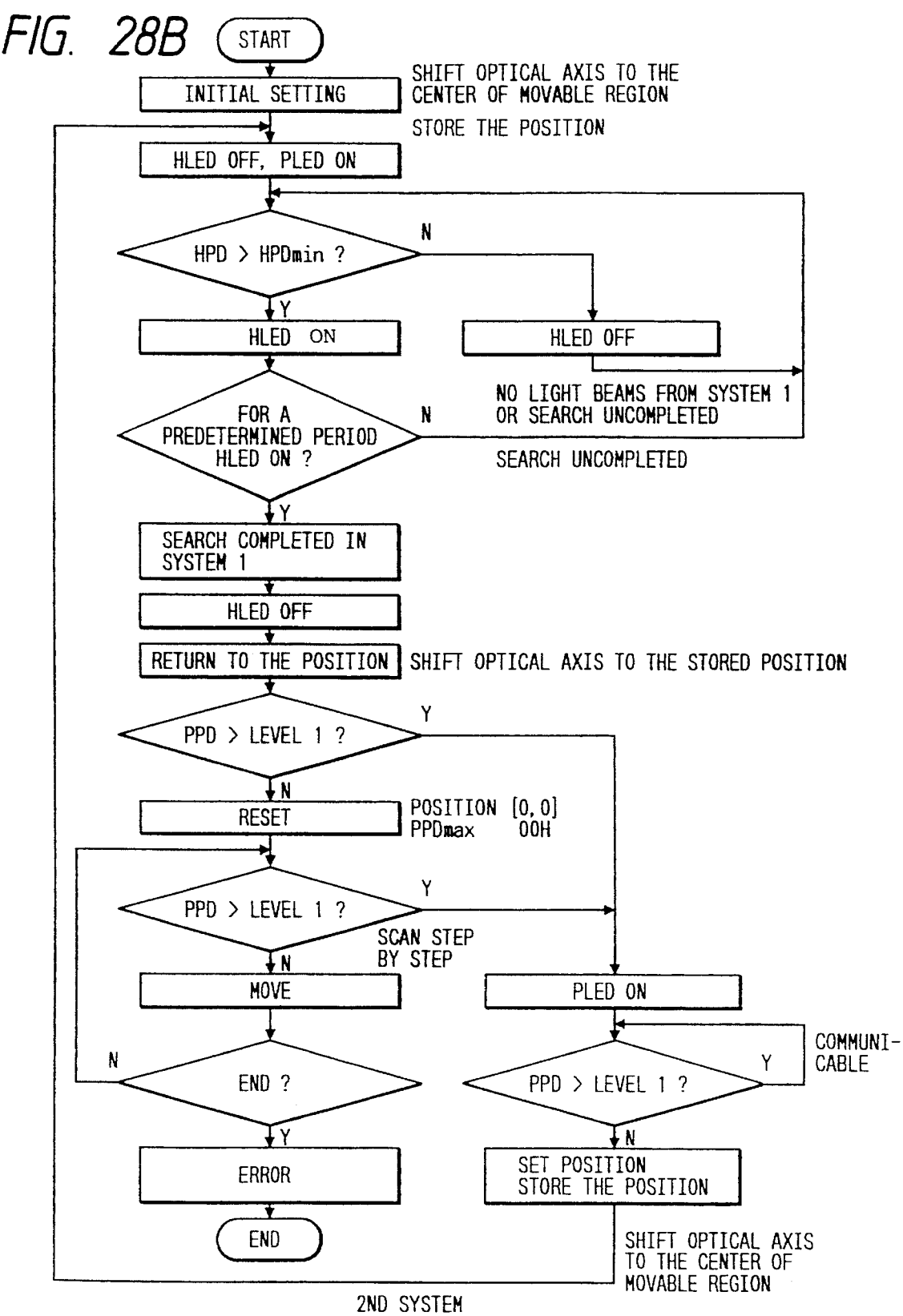

Referring to FIGS. 28(*a*) and 28(*b*), an operation of the pair of optical radio transmitting systems 43E, 43F in order to adjust their optical axes will be described hereinafter. FIG. 28(*a*) is a flowchart for the operation in the first optical radio transmitting system 43E, while FIG. 28(*b*) is a flowchart for the operation in the second optical radio transmitting system 43F. Before describing the operation for adjustment of the optical axes of the systems, terms appearing in the flowcharts will be defined as follows:

HLED: the light emitting means of a wide-directivity 66;

PLED: the light emitting means of a narrow-directivity 10 or 10A;

HPD: an intensity level of incoming light beams received by the light receiving means of a wide directivity 66;

HPDmin: a light intensity level when no signal is transmitted (i.e., only noise exists);

LEVEL 1: an intensity level of incident light beams when communicable.

The operations of the systems are carried out as follows:

(1) When energized, the second optical radio transmitting system 43F turns itself so that the front of the system 43F positions in the center of its movable range (INITIAL SETTING). After the wide angle light emitting element 66 and the narrow angle light receiving means 20A are turned off (66 OFF, 20A OFF), the wide angle light receiving means 65 waits incident light beams in a range of in ±15° that is a movable range of the system 43F, as shown FIG. 28 (*b*).

(2) When energized, the first optical radio transmitting system 43E turns itself so that the front of the system 43E positions in a start point (INITIAL SETTING) to enter a scanning mode, as shown in FIG. 28(*a*). The scanning is performed in a step by step manner from the left to the right within a movable range of the transmitting-receiving means, as shown in FIG. 11.

(3) When receiving light beams emitted from the first optical radio transmitting means 43E (HPD>HPDmin), the wide angle light receiving means 65 of the second optical radio transmitting system 43F informs the first optical radio transmitting system 43E positioning in its movable range the reception of the light beams by illuminating the wide angle light emitting means 66 (HLED ON), as shown in FIG. 28(*b*).

(4) When receiving light beams emitted from the second optical radio transmitting system 43F during its scanning operation (PPD>PPDmin), the first optical radio transmitting system 43E makes a judgement that the optical axis 23 of the system 43E is aiming to the second optical radio transmitting system 43F and terminates its scanning operation. Incidentally, when the optical axis 13 of the light emitting means 10 is directed to the second optical radio transmitting system 43F, it is also possible to receive the light beams from the second optical radio transmitting system 43F at the narrow angle light receiving means since the optical axis 23 of the light receiving means 20 is always directed to the same direction, as shown in FIG. 28(*a*).

(5) The first optical radio transmitting system 43E stores a level of incident light beams at the time of the termination of its scanning operation (PPD=PPDmax) and waits light beams emitted from the narrow angle light emitting means 20A of the second optical radio transmitting means that informs the termination of the scanning operation of the second optical radio transmitting system 43F. The light beams emitted from the narrow angle light emitting means 20A has a light intensity level much higher than the light beams emitted from the wide angle light emitting means.

(6) When detecting the light beams emitted from the narrow angle light emitting means 10A of the first optical radio transmitting system 43E at the wide angle light receiving means 65 for a predetermined period (HELD ON FOR A PREDETERMINED PERIOD), the second optical radio transmitting system 43F makes a judgement that the first optical radio transmitting system terminates its scanning operation and initiates its own scanning operation. If an intensity level of the received light beams reaches a communicable level, no scanning operation is made, as shown in FIG. 28(*b*).

(7) When receiving the light beams emitted from the first optical radio transmitting system 43E at the narrow light receiving means 20A during its scanning operation (PPD>LEVEL 1), the second optical radio transmitting system 43F terminates its scanning operation, illuminates the narrow angle light emitting means 10A (PLED ON) and gets into a communicable state, as shown in FIG. 28(*b*).

(8) When receiving the light beams emitted from the narrow angle light emitting means 10A of the second optical radio transmitting system 43F (PPD>LEVEL 1), the first optical radio transmitting system 43E makes a judgement that the second optical radio transmitting system 43F terminates the scanning operation and gets into a communicable state.

Through the above steps, the two systems 43E, 43F become communicable. During the communicable condition, it is desirable to monitor the guide beams every time or occasionally, thereby enabling rescanning operation when the optical axes are deviated due to, for example, application of an external force.

Figure 31A:
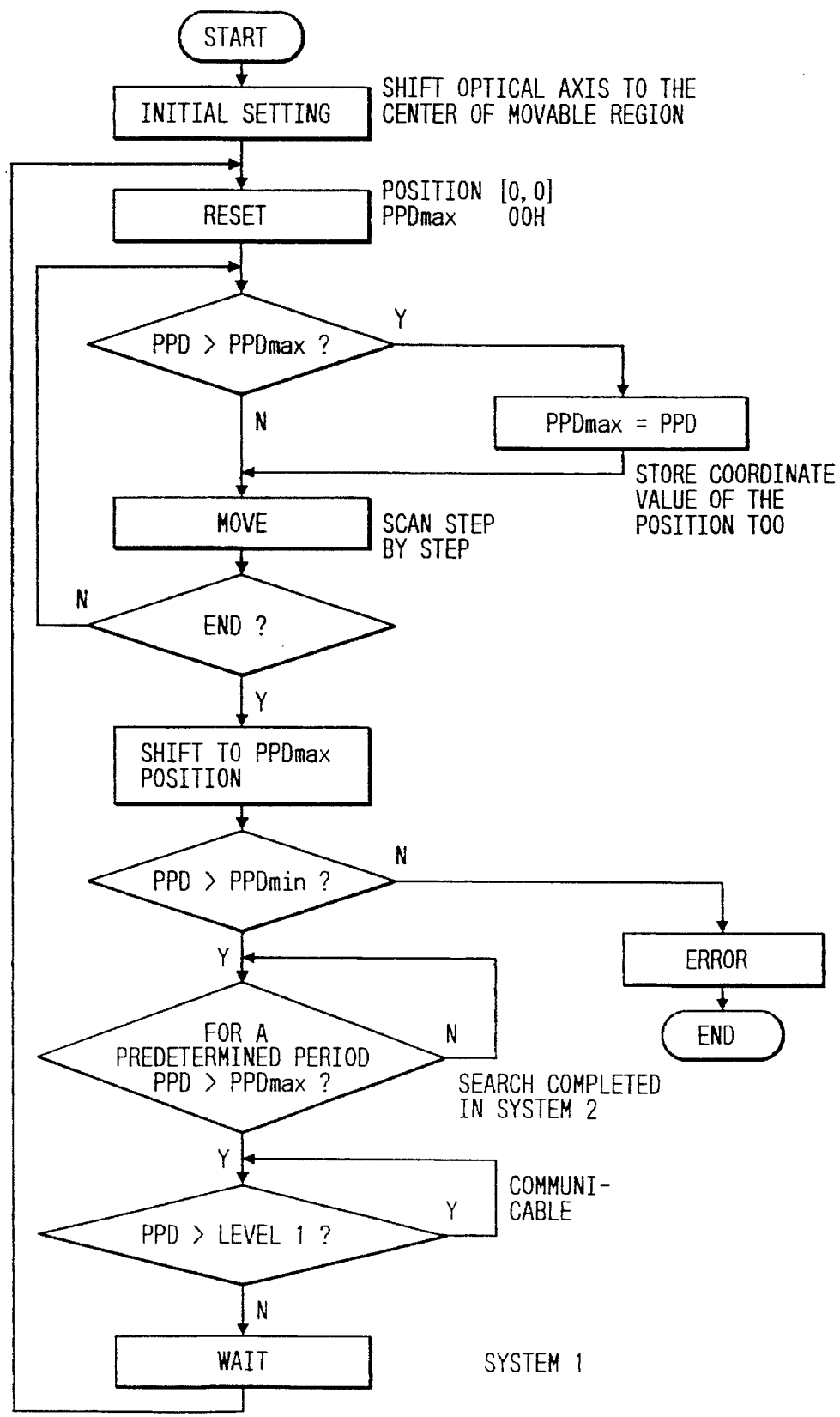
FIGS. 31(a) and 31(b) are flowcharts showing anther method for adjusting optical axes of the optical radio transmitting systems shown in FIGS. 27(a) and 27(b), according to this invention.
Figure 31B:
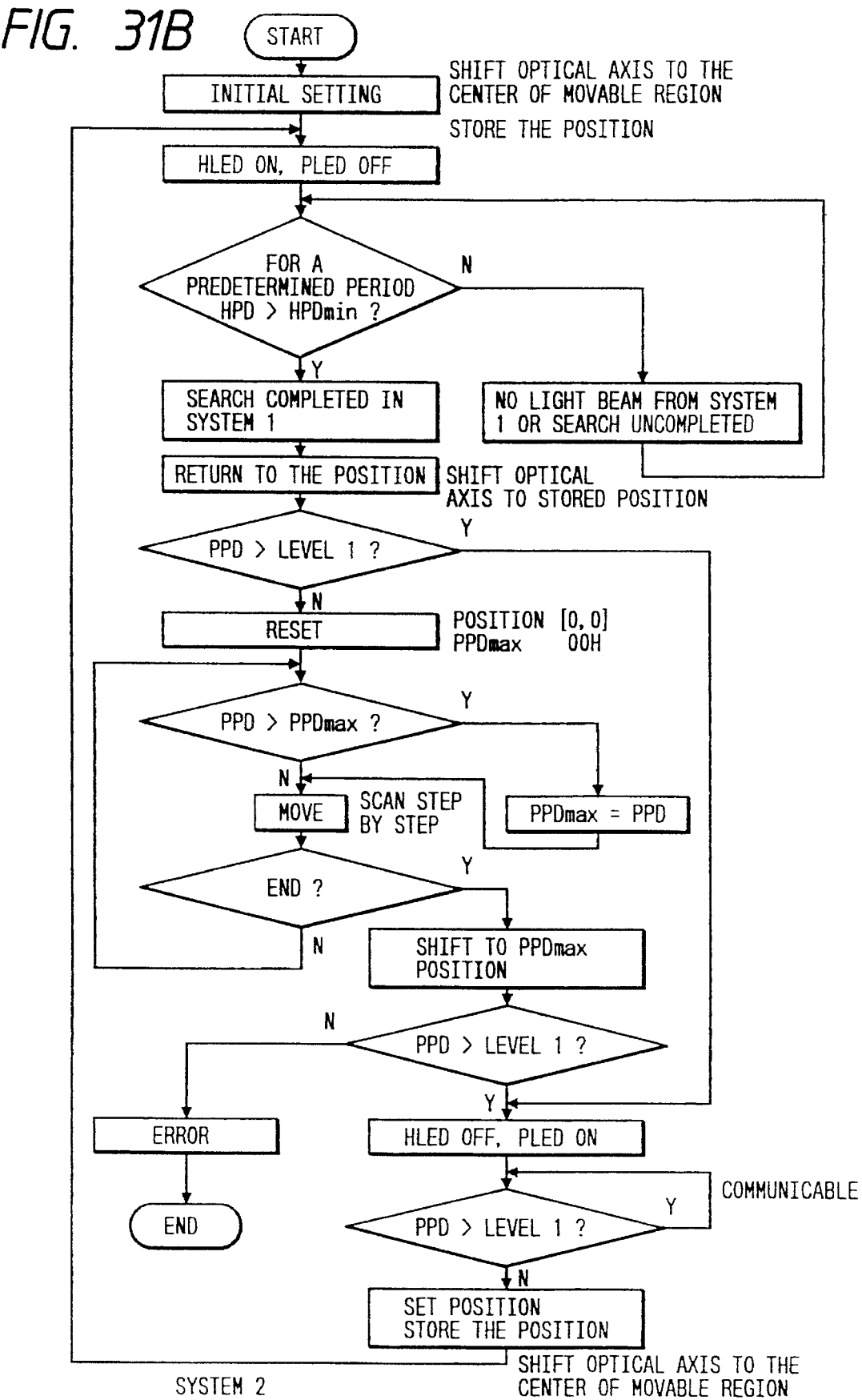

FIGS. 31(*a*) and 31(*b*) are flowcharts showing another method for adjustment of the optical axes of the first and the second optical radio transmitting systems 43E, 43F having the circuits shown in FIGS. 27(*a*) and 27(*b*).

(1) When energized, the second optical radio transmitting system 43F turns itself to make its own front portion position in the center of its movable range (INITIAL SETTING). Only the wide angle light receiving means 66 is turned on (HLED ON, PLED OFF) and waits incident light beams within its movable range of ±15°, as shown in FIG. 31(*b*), as shown in FIG. 31 (*b*).

(2) When energized, the first optical radio transmitting system 43E turns itself so that the front portion of the first optical radio transmitting system 43E positions in a start point (INITIAL SETTING) to enter a scanning mode, as shown in FIG. 31(*a*). The scanning is performed in a step by step manner from the left to the right within a movable range of the transmitting receiving means as shown in FIG. 11.

(3) The first optical radio transmitting system 43E makes its front portion position in a point where incident light beams are in the maximum level among all scanned points (SHIFT IN PPDmax POSITION) and terminates its scanning operation, as shown in FIG. 31(*a*).

(4) The first optical radio transmitting system 43E stores a light intensity level of the incident light beams at the moment of termination of the scanning operation, and waits light beams emitted from the narrow angle light emitting means 20A of the second optical radio transmitting system 43F that informs of the termination of its scanning operation of the second optical radio transmitting system 43F, as shown in FIG. 31 (*a*). Incidentally, the light beams emitted from the narrow angle light emitting means 20A has light intensity level much higher than the light beams emitted from the wide angle light emitting means 66.

(5) When detecting light beams emitted from the narrow angle light emitting means 10A of the first optical radio transmitting system 43E at the wide angle light receiving means 65 for a predetermined period (HPD>HPDmin FOR A PREDETERMINED PERIOD), the second optical radio transmitting system 43F makes a judgement that the first optical radio transmitting system 43E terminates the scanning operation and initiates its own scanning operation, as shown in FIG. 31(*b*). If the received light beams reach a communicable level, no scanning operation is made.

(6) The second optical radio transmitting system 43F moves its front portion to a position of a point where the incident light beams has the maximum level among all scanned points (SHIFT TO PPDmax POSITION) and terminates the scanning operation. If the level of the incident light beams is lower than the communicable level (PPD>PPDmin), the second optical radio transmitting system 43F judges it as an uncommunicable level and outputs an error signal (ERROR). When a level of the incident light beams reaches communicable level, the wide angle light emitting means 66 is turned off and the narrow angle light emitting means 10A emits light beams (PLED ON, HLED OFF) to get into a communicable condition, as shown in FIG. 31(*b*).

(7) When receiving light beams emitted from the narrow angle light emitting means 10A of the second optical radio transmitting system 43F (PPD>LEVEL 1 ), the first optical radio transmitting system 43E makes a judgement that the, second optical radio transmitting system 43F terminates the scanning operation and gets into a communicable condition, as shown i n FIG. 31(*a*).

Through the above steps, the first and the second optical radio transmitting systems 43E, 43F become communicable to each other. In this method, the system scans all the points, then directs its optical axis to a point where the level is the maximum. This technique is for more accurate adjustment of the optical axis. This technique is effective to prevent discontinuation of the communication pass when the optical radio transmitting system is subjected to a slight vibration force.

Figure 32A:
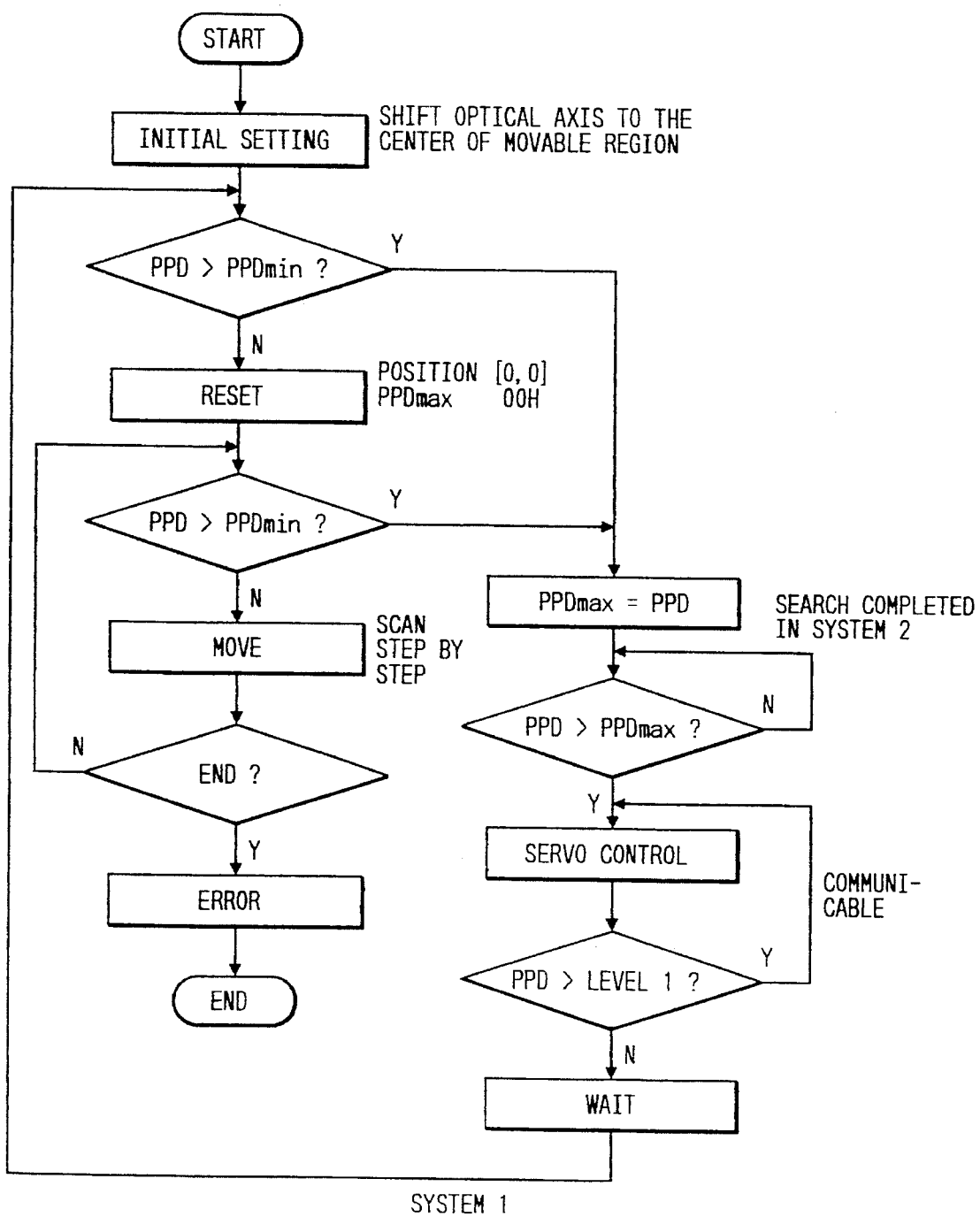
FIGS. 32(a) and 32(b) are flowcharts of still another method for adjusting optical axes of the optical radio transmitting systems in FIGS. 27(a) and 27(b), according to this invention.
Figure 32B:
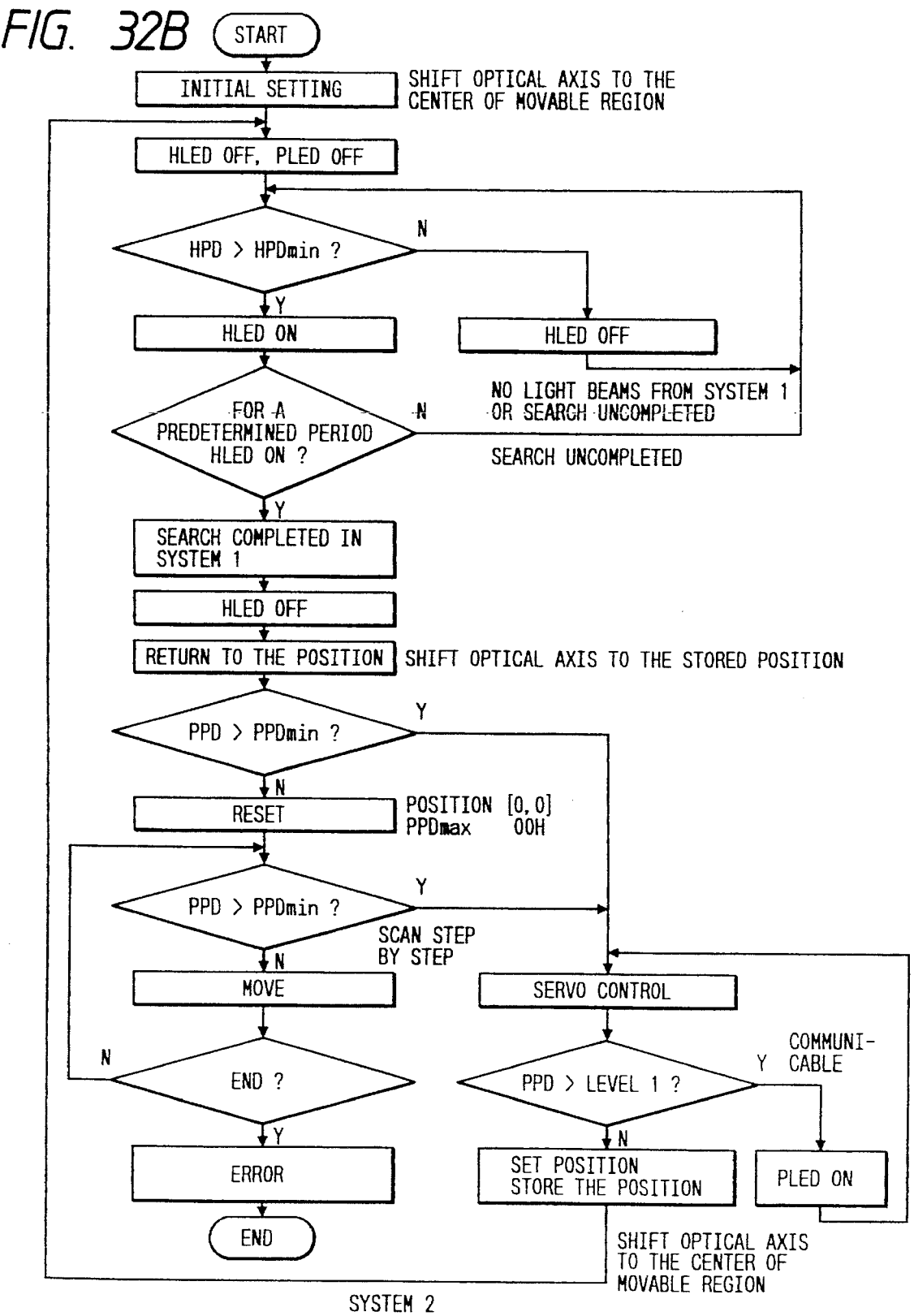
Figure 33A:
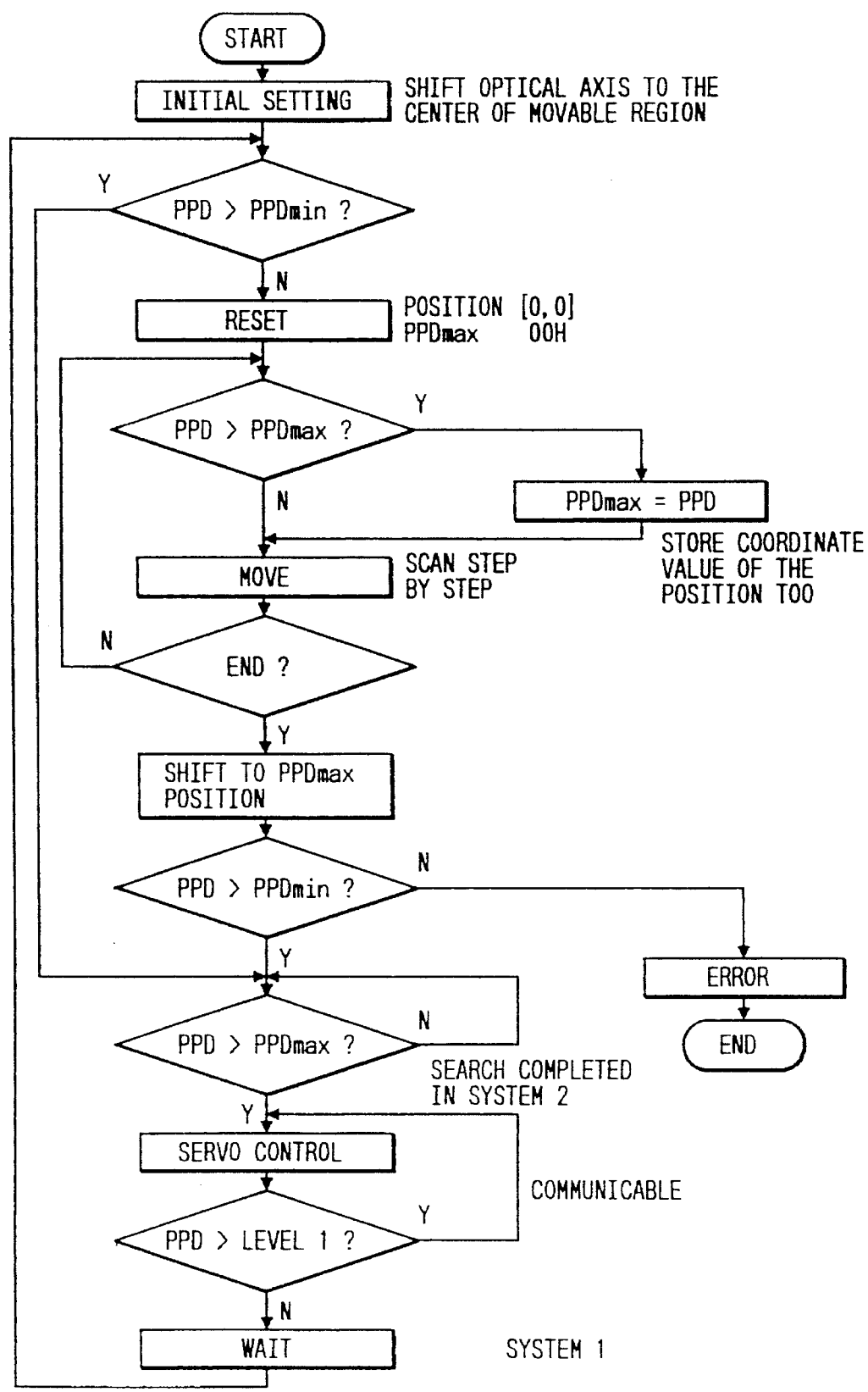
FIGS. 33(a) and 33(b) are flowcharts of still another method for adjusting optical axes of the optical radio transmitting systems in FIGS. 27(a) and 27(b), according to this invention.
Figure 33B:
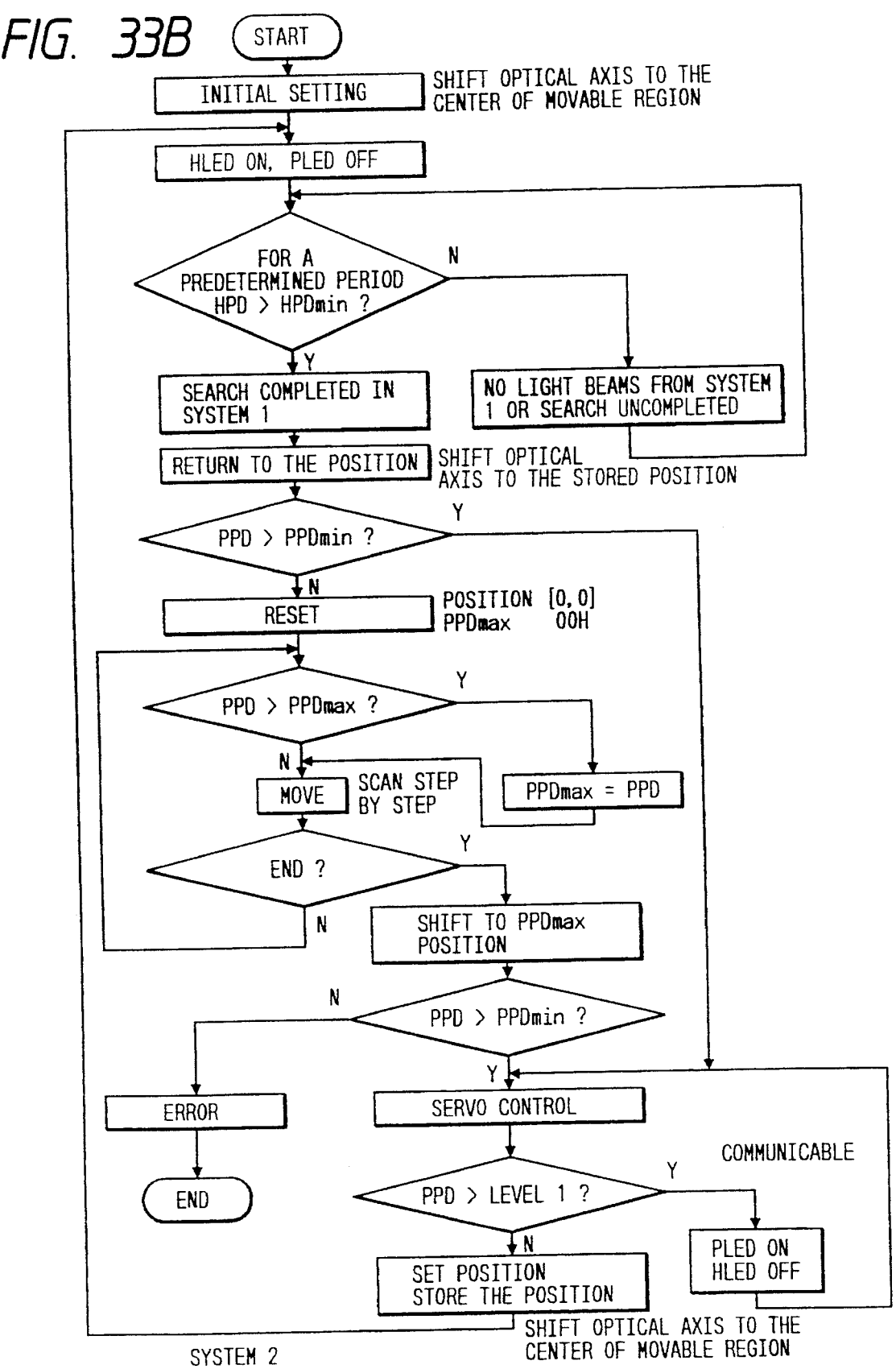

Referring to FIGS. 32(*a*) and 32(*b*), there are illustrated another method for adjusting optical axes of two optical radio transmitting systems. FIGS. 33(*a*) and 33(*b*) show still another method for adjusting optical axes of two optical radio transmitting systems. FIGS. 27(*a*) and 27(*b*) are block circuit diagrams of optical radio transmitting systems employed in these methods. Each system has a light receiving element 22a divided into four sections in a narrow angle light receiving means 20A, as shown in FIG. 25. These four sections of the light receiving element 22a are used to receive light beams of respective levels by switching these sections to provide accurate adjustment of an optical axis and instantaneous correction of deviation of the optical axis after establishment of a communication path. This technique will be hereinafter called a servo control.

Figure 30B:
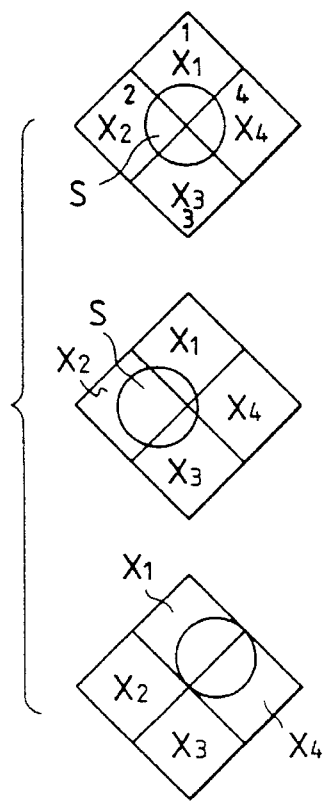
FIGS. 30(a) and 30(b) show a narrow angle light receiving element divided into four sections, where
Figure 30A:
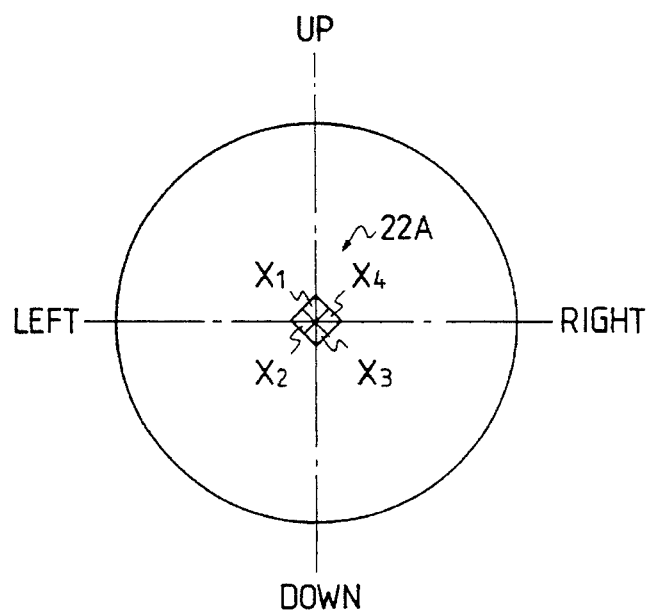

This servo control technique will be hereinafter described in detail, referring to FIGS. 30(*a*) and 30(*b*). A narrow light receiving means 20A is formed with a light receiving element 22a of a integrated circuit type divided into four square section X1 through X4 or with four separate light emitting elements that are closely joined to each other, as shown n FIG. 30(*b*). The light emitting element 22a is preferably a pin photodiode. While the system is in a communicable condition, the system always or often monitors the levels of the four sections X1 through X4 so as to keep the levels of the four sections are equal to each other. If the four sections have different levels, the system shift its direction to diminish the difference or to bring a ratio of values of the four levels near 1 in order to correct a direction of the optical axis, as shown in FIG. 30(*b*). FIG. 30(*a*) illustrates a relationship between the light emitting element 22a divided into four sections X1 through X4 and a parabolic reflector 21 of the narrow angle light receiving means 20A. According to this servo technique, it is possible to always coincide the optical axis 23 of the narrow angle light receiving means 20A with an optical axis 13 of a light emitting means 10 of an objective system to ensure a reliable communication path between the two systems.

As above, FIGS. 32(*a*) and 32(*b*) illustrates a method for adjustment of the optical axis corresponding to the method shown in FIGS. 28(*a*) and 28(*b*), employing the above servo technique, FIGS. 33(*a*) and 33(*b*) illustrates another method for adjustment of the optical axis corresponding to the method shown in FIGS. 31(*a*) and 31(*b*).

FIGS. 34(*a*), 34(*b*) and 34(*c*) show various relationships of parabolic reflectors for transmission and reception of two optical radio transmitting systems. FIG. 34(*a*) illustrates a case where the two optical radio transmitting systems have the same arrangement of a transmitting means 10 and a receiving means 20 with respect to their positional relationship. In the drawings, optical axes 13 and 23 of a transmitting means 10 and a receiving means of a left optical radio transmitting system 43A are coincided with optical axes 23 and 13 of a receiving means 20 and a transmitting means 10 of the right optical radio transmitting system 43B, as indicated by solid lines, where the optical axes 13, 23 of the left optical radio transmitting system and the optical axes 23, 13 of the right optical radio transmitting system intersect at a mid-point. If the right optical radio transmitting system is brought near the left optical radio transmitting system as shown by broken lines, the optical axis 23 of the receiving means 20 of the right optical radio transmitting system coincides with the optical axis 13 of the transmitting means 10 of the left optical radio transmitting system, but the optical axis 13 of the transmitting means of the right optical radio transmitting system does not coincide with the optical axis 23 of the receiving means 20 of the left optical radio transmitting system, since the optical axis of the transmitting means 10 of the right optical radio transmitting means moves integrally with the receiving means 20 of the same.

FIG. 34(*b*) illustrates a case where a transmitting means 10 and a receiving means 20 of the left optical radio transmitting system have a reverse positional relationship with those of the right optical radio transmitting system. In this ease, when an optical axis of a receiving means 20 of an optical radio transmitting system coincides with an optical axis of a transmitting means 10 of the other optical radio transmitting system, an optical axis of the transmitting means 10 always coincides with an optical axis of the receiving means 20 of the other optical radio transmitting system, irrespective of a distance between the two optical radio transmitting systems.

FIG. 34(*c*) illustrates a modification where a transmitting means 10 and a receiving means 20 are arranged on the same optical axis. In this case, a parabolic reflector 11 of a transmitter 10 should have a diameter sammer than that of a parabolic reflector 20 of a receiver 20.

FIGS. 35(*a*) and 35(*b*) illustrate a relationship of directivity of the parabolic reflectors between a transmitting means 10 and a receiving means 20.

In FIG. 35(*a*), a receiving means 20 has a parabolic reflector of a diameter larger than that of a transmitting means 10. If a optical radio transmitting system on the right side is positioned as indicated by dotted lines, the receiving means 20 of the left optical radio transmitting system is within a service area of the transmitting means 10 of the right optical radio transmitting system, but optical axis of the transmitting means of the left optical transmitting system does not aim the receiving means 20 of the right optical transmitting system, since the receiving means 20 has a directivity wider than that of the transmitting means 10.

In FIG. 35(b), if a transmitter 10 has a directivity wider than or equal to that of a receiving means 20, the transmitting means 10 of an optical radio transmitting system on the left side is always directed to a receiving means 20 of a optical radio transmitting system on the right side so far as a receiving means 20 of the left optical radio transmitting means is within a service area of a transmitting means 10 of the left optical radio transmitting means.

FIG. 36 shows an example of a network employing optical radio transmitting systems according to this invention therein and method for adjusting optical axes of the systems according to this invention.

As appreciated from the above description, it is sufficient to roughly set two optical radio transmitting systems to establish a communication path for optical radio communication since the optical radio transmitting system according to this invention has a narrow directivity. As shown in FIG. 36, it is possible to operatively install plural sets of the optical radio transmitting systems without occurrence of interference therebetween, thus suitable to optical radio LAN or the like.

In the above embodiments, methods for adjustment optical axes according to this invention are applicable to an optical axis adjusting technique or optical axis tracking technique in a system using a lens, laser beams therein, although a parabolic reflector is used to gather light beams emitted from a nondirectional LED in the embodiment of this invention.

It is extremely difficult to accurately adjust and coincide an optical axis of a light emitting means with an optical axis of a light receiving means by hand. In addition, a slight deviation of an optical axis may cause interruption of the communication. This invention enables easy and automatic adjustment of optical axes and instantaneous correction of slight deviation of the optical axis.

While the foregoing description is directed to a presently preferred embodiments, it will be obvious to one of ordinary sill that various modifications may be made without departing from the true spirit or scope of the invention which is to be limited only by the appended claims.

What is claimed is:

1. An optical radio communication system comprising:

a first light transmitting system; and a second light transmitting system;

each of which light transmitting systems comprising:

a transmitting means comprising:

a light emitting element positioned in a region including and surrounding a focal point of a first parabolic reflector for emitting light beams;

said first parabolic reflector having an inner reflective surface for reflecting said light beams emitted from said light emitting element; and a means for driving said light emitting element with a signal to be transmitted;

a receiving means comprising:

a second parabolic reflector having an inner reflective surface for reflecting incident light beams;

a light receiving element positioned in a region including and surrounding a focal point of said second parabolic reflector for receiving light beams reflected by said second parabolic reflector to output signals; and means for taking out information from said signals outputted from said light receiving element, said optical radio communication system comprising at least a pair of said first and second light transmitting systems, wherein said pair of said first and second light transmitting systems are configured for implementing duplex optical radio communication, and wherein, in each of said first and second light transmitting systems, said transmitting means is integrally combined with said receiving means so that, in each of said first and second light transmitting systems an optical axis of said transmitting means is in parallel with an optical axis of said receiving means integrally combined therewith in duplex optical radio communication, wherein said first light transmitting system includes a first projector means of a wide directivity provided in the vicinity of said transmitting means thereof to emit first guide beams, and said second light transmitting system includes a second projector means of a wide directivity provided in the vicinity of said transmitting means thereof to emit second guide beams, said first guide beams having a carrier frequency different from that of said second guide beams for varying an intensity of the first and second guide beams and for isolating the first and second guide beams while adjusting said optical axes.

2. An optical radio communication system according to claim 1, wherein said second light transmitting system still further includes a light receiver means of a wide directivity provided in the vicinity of said receiving means to receive said first guide beams emitted from said transmitting means of said first light transmitting system.

3. An optical radio communication system according to claim 1, wherein said transmitting means and said receiving means of said first light transmitting system have a positional relationship reverse to that of said transmitting means and receiving means of said second light transmitting system.

4. An optical radio communication system according to claim 1, wherein in one of said first and second light transmitting systems, said first parabolic reflector of said transmitting means has a diameter smaller than that of said receiving means and an optical axis of said first parabolic reflector coincides with that of said second parabolic reflector.

5. An optical radio communication system according to claim 1, wherein in at least one of said pairs of first and second light transmitting systems, said transmitting means has a directivity wider than that of said receiving means integrally combined therewith.

6. An optical radio communication system according to claim 1, wherein said optical radio communication system comprises a plurality of pairs of said first and second light transmitting systems.

7. An optical radio communication system according to claim 6, wherein each of said pairs of said first and second light transmitting systems are configured for implementing duplex optical radio communication, and wherein, in each of said pairs of first and second light transmitting systems, said transmitting means is integrally combined with said receiving means so that, in each of said pairs, an optical axis of said transmitting means is in parallel with an optical axis of said receiving means used therewith in duplex optical radio communication.

8. In an optical radio communication system according to claim 1, a method for adjusting optical axes of said light transmitting systems comprising the steps of:

emitting first guide beams from said transmitting means of said first light transmitting system and shifting an optical axis of said transmitting means thereof upon start up of said first light transmitting system;

receiving said first guide beams at said light receiver means of a wide directivity of said second light transmitting means to make said second light transmitting means perceive that an optical axis of said second light transmitting means is directed to said first light transmitting system;

emitting second guide beams from said projector means of a wide directivity of said second light transmitting system;

receiving said second guide beams at said receiving means of said first light transmitting system and making said first light transmitting system perceive that an optical axis of said receiving means of said first light transmitting system is directed to said second light transmitting system;

adjusting the optical axis of said receiving means of said first light transmitting system;

emitting third guide beams from said transmitting means of said first light transmitting system after perceiving that the optical axis of said receiving means of said first light transmitting system is directed to said second light transmitting system;

shifting an optical axis of said receiving means of said second light transmitting system when said transmitting means of said first light transmitting system emits said third guide beams;

receiving said third guide beams at said receiving means of said second light transmitting system and making said second light transmitting system perceive that an optical axis of said receiving means of said second light transmitting system is directed to said first light transmitting means; and adjusting an optical axis of said receiving means of said second light transmitting system.

9. An optical radio communication system comprising:

a first light transmitting system; and a second light transmitting system;

each of which light transmitting systems comprising:
  a transmitting means comprising:
    a light emitting element positioned in a region including and surrounding a focal point of a first parabolic reflector for emitting light beams;
    said first parabolic reflector having an inner reflective surface for reflecting said light beams emitted from said light emitting element; and
    a means for driving said light emitting element with a signal to be transmitted;
  a receiving means comprising:
    a second parabolic reflector having an inner reflective surface for reflecting incident light beams;
    a light receiving element positioned in a region including and surrounding a focal point of said second parabolic reflector for receiving light beams reflected by said second parabolic reflector to output signals; and
    means for taking out information from said signals outputted from said light receiving element, said optical radio communication system comprising at least a pair of said first and second light transmitting systems, wherein said pair of said first and second light transmitting systems are configured for implementing duplex optical radio communication, and wherein, in each of said first and second light transmitting systems, said transmitting means is integrally combined with said receiving means so that, in said pair, an optical axis of said transmitting means is in parallel with an optical axis of said receiving means used therewith in duplex optical radio communication, wherein said transmitting means of said first light emitting system emits first and third guide beams, and said second light transmitting system further includes:
  a projector means of a wide directivity provided in the vicinity of said transmitting means thereof to emit second guide beams, and
  a light receiver means of a wide directivity provided in the vicinity of said receiving means thereof to receive said first guide beams emitted from said first light transmitting system.

10. In an optical radio communication system according to claim 9, a method for adjusting optical axes of said light transmitting means comprising the steps of:

emitting second guide beams from said projector means of a wide directivity of said second light transmitting means during its idling state;

shifting an optical axis of said receiving means of said first light transmitting system upon start up of said first light transmitting system;

receiving said second guide beams at said receiving means of said first light transmitting system and making said first light transmitting system perceive that an optical axis of said first light transmitting system is directed to said second light transmitting system;

emitting first guide beams from said transmitting means of said first light transmitting system;

receiving said first guide beams at said light receiver means of a wide directivity of said second light transmitting system and making said second light transmitting system perceive that an optical axis of said second light transmitting system is directed to said first light transmitting system;

shifting an optical axis of said receiving means of said second light transmitting system;

receiving said first guide beams at said receiving means of said second light transmitting system and making said second light transmitting system perceive that an optical axis of said receiving means of said second light transmitting system is directed to said first light transmitting system; and adjusting the optical axis of said receiving means of said second light transmitting system.

11. An optical radio communication system according to claim 9, wherein said second light transmitting means further includes a projector means of a wide directivity provided in the vicinity of said transmitting means to emit first guide beams, said transmitting system of said first light transmitting system emits second guide beams, and a second light transmitting system still further includes a light receiver means of a wide directivity provided in the vicinity of said receiving means to receive second guide beams emitted from said transmitting means of said first light transmitting system.

12. An optical radio communication system according to claim 9, wherein said transmitting means and said receiving means of said first light transmitting system have a positional relationship reverse to that of said transmitting means and receiving means of said second light transmitting system.

13. An optical radio communication system according to claim 9, wherein in one of said first and second light transmitting systems, said first parabolic reflector of said transmitting means has a diameter smaller than that of said receiving means and an optical axis of said first parabolic reflector coincides with that of said second parabolic reflector.

14. An optical radio communication system according to claim 9, wherein in at least one of said pairs of first and second light transmitting; systems, said transmitting means has a directivity wider than that of said receiving means integrally combined therewith.

15. An optical radio communication system according to claim 9, wherein said optical radio communication system comprises a plurality of pairs of said first and second light transmitting systems.

16. An optical radio communication system according to claim 9, wherein said pairs of said first and second light transmitting systems are configured for implementing duplex optical radio communication, and; wherein, in each of said pairs of first and second light transmitting systems, said transmitting means is integrally combined with said receiving means so that, in each of said pairs, an optical axis of said transmitting means is inn parallel with an optical axis of said receiving means used therewith in duplex optical radio communication.

* * * * *

UNITED STATES PATENT AND TRADEMARK OFFICE
CERTIFICATE OF CORRECTION

PATENT NO.    : 5,532,858
DATED         : July 2, 1996
INVENTOR(S)   : Kazutoshi Hirohashi et al.

It is certified that error appears in the above-identified patent and that said Letters Patent is hereby corrected as shown below:

Title page,
Item [73], Assignees, replace "Nit Data Communications Victor Company of Japan, Yokohama; Systems Corporation, Tokyo, both of Japan" with the following:
-- Victor Company of Japan, Ltd., Yokohama; NTT Data Communications Systems Corporation, Tokyo, both of Japan--.

Signed and Sealed this

Twenty-ninth Day of July, 2003

JAMES E. ROGAN
*Director of the United States Patent and Trademark Office*